United States Patent
Ruepping

(10) Patent No.: US 6,346,300 B1
(45) Date of Patent: Feb. 12, 2002

(54) UV CURABLE ELASTOMER COMPOSITION

(75) Inventor: Christian Ruepping, Petit Lancy (CH)

(73) Assignee: DuPont Dow Elastomers L.L.C., Wilmington, DE (US)

( * ) Notice: Subject to any disclaimer, the term of this patent is extended or adjusted under 35 U.S.C. 154(b) by 0 days.

(21) Appl. No.: 09/353,982

(22) Filed: Jul. 15, 1999

Related U.S. Application Data

(63) Continuation-in-part of application No. 09/234,014, filed on Jan. 19, 1999, now abandoned.
(60) Provisional application No. 60/072,109, filed on Jan. 21, 1998.

(51) Int. Cl.[7] .................................................. B05D 3/06
(52) U.S. Cl. ........................ 427/517; 427/519; 427/520
(58) Field of Search ................................ 427/508, 517, 427/519, 520

(56) References Cited

U.S. PATENT DOCUMENTS

| | | | |
|---|---|---|---|
| 2,968,649 A | 1/1961 | Pailthorp et al. | 260/80.5 |
| 3,051,677 A | 8/1962 | Rexford | 260/29.6 |
| 3,682,872 A | 8/1972 | Brizzolara et al. | 260/80.76 |
| 3,867,270 A | 2/1975 | Malatesta et al. | 204/159.18 |
| 3,883,472 A | 5/1975 | Greene et al. | 260/42.52 |
| 3,894,118 A | 7/1975 | Aronoff et al. | 260/884 |
| 3,950,238 A | 4/1976 | Eldred | 204/159.15 |
| 4,035,565 A | 7/1977 | Apotheker et al. | 526/249 |
| 4,275,180 A | 6/1981 | Clarke | 525/173 |
| 4,281,092 A | 7/1981 | Breazeale | 526/247 |
| 4,413,019 A | 11/1983 | Brenner | 427/36 |
| 4,564,662 A | 1/1986 | Albin | 526/247 |
| 4,694,045 A | 9/1987 | Moore | 525/276 |
| 4,745,165 A | 5/1988 | Arcella et al. | 526/247 |
| 4,770,927 A | 9/1988 | Effenberger et al. | 428/245 |
| 4,863,536 A | 9/1989 | Heidenhain et al. | 156/56 |
| 4,868,251 A | 9/1989 | Reich et al. | 525/479 |
| 4,880,849 A | 11/1989 | Poole et al. | 522/10 |
| 4,945,003 A | 7/1990 | Poole et al. | 428/462 |
| 4,946,752 A | 8/1990 | Tomita et al. | 430/18 |
| 4,948,825 A | 8/1990 | Sasaki | 524/274 |
| 4,948,832 A | 8/1990 | Ostermayer et al. | 524/504 |
| 4,973,633 A | 11/1990 | Moore | 526/247 |
| 4,983,697 A | 1/1991 | Logothetis | 526/206 |
| 5,084,346 A | 1/1992 | Ono et al. | 428/339 |
| 5,115,008 A | 5/1992 | Sasaki | 524/271 |
| 5,128,386 A | 7/1992 | Rehmer et al. | 522/35 |
| 5,135,978 A | 8/1992 | Sasaki | 524/274 |
| 5,151,492 A | 9/1992 | Abe et al. | 526/206 |
| 5,164,462 A | 11/1992 | Yang | 525/478 |
| 5,169,902 A | 12/1992 | Yagi et al. | 525/301 |
| 5,272,236 A | 12/1993 | Lai et al. | 526/348.5 |
| 5,278,272 A | 1/1994 | Lai et al. | 526/348.5 |
| 5,407,971 A | 4/1995 | Everaerts et al. | 522/35 |
| 5,536,758 A | 7/1996 | Boldt | 522/4 |
| 5,656,697 A | 8/1997 | Wlassics et al. | 525/326.3 |
| 5,789,509 A | 8/1998 | Schmiegel | 526/247 |
| 5,824,755 A | 10/1998 | Hayashi et al. | 526/206 |

FOREIGN PATENT DOCUMENTS

| | | |
|---|---|---|
| CA | 2067891 | 11/1992 |
| DE | 19541923 * | 5/1997 |
| DE | 195 41 923 A1 | 5/1997 |
| DE | 19642029 | 5/1997 |
| EP | 0 428 133 A2 | 5/1991 |
| EP | 0 486 278 A1 | 5/1992 |
| EP | 486278 * | 5/1992 |
| EP | 0 570 254 A1 | 11/1993 |
| JP | 56-143284 * | 11/1981 |
| JP | 61-31411 | 2/1986 |
| JP | 63-267517 | 4/1987 |
| JP | 62-167385 * | 7/1987 |
| JP | 2086680 | 3/1990 |
| JP | 06145607 | 11/1992 |
| JP | 05078539 | 3/1993 |
| JP | 05302058 | 11/1993 |
| JP | 6-116546 * | 4/1994 |
| JP | 6116546 | 4/1994 |

OTHER PUBLICATIONS

Chomerics Division, Parker Hannifin Corporation, Cho–Form Automated Form–In Place EMI Gasketing Technology, 1–12, Sep., 1998.

Bryan G. McClelland, Cure–in Place Gasketing (CIPG) Offers Process and Quality Improvements as a Water Pump Flange Seal in Gaskets and Sealants for Automotive Applications, *SAE Special Publications*, 1235, 47–51, 1997.

Elizabeth S. Brandt and Anthony J. Berejka, Electron Beam Crosslinking of Wire and Cable Insulation, *Rubber World*, Nov. 1978.

Anestis L. Logothetis, Chemistry of Fluorocarbon Elastomners, *Prog. Polym. Sci.*, 14, 251–296, 1989.

20817 Oil Resistant Sheathing Compositions for Electric Cables, *Research Disclosure*, Aug., 1981.

\* cited by examiner

*Primary Examiner*—Erma Cameron

(57) ABSTRACT

Ethylene copolymer elastomer compositions, acrylate rubber compositions, nitrile rubber compositions, fluoroelastomer compositions, and chlorinated elastomer compositions are provided which are curable by exposure to UV radiation. The compositions are particularly suited for production of elastomeric seals using hot melt equipment and a gasketing in place technique.

19 Claims, No Drawings

UV CURABLE ELASTOMER COMPOSITION

CROSS-REFERENCE TO RELATED APPLICATIONS

This is a continuation-in-part of application Ser. No. 09/234,014 filed Jan. 19, 1999, now abandoned, which claims the benefit of U.S. Provisional Application Ser. No. 60/072,109 filed Jan. 21, 1998.

FIELD OF THE INVENTION

This invention relates to elastomeric compositions that are curable by exposure to ultraviolet (UV) radiation. In addition, this invention relates to a process for curing elastomeric seals rapidly, wherein the seals are formed by applying an uncured polymer composition directly onto a sealing element or a surface to be sealed. This invention further relates to cured articles produced by the process of the invention.

BACKGROUND OF THE INVENTION

Elastomeric compositions require a vulcanization, i.e. curing, step in order to develop the crosslinked network structure which confers optimum rubbery properties to such compositions. Typically, the curing processes are based on compression molding or transfer molding techniques wherein an elastomer, fully compounded with curing agent and other additives, is introduced into a mold that is then heated under pressure. The elevated temperatures used during the molding process cause chemical reaction of the elastomer and curative, thereby producing a crosslinked product.

The particular raw (i.e. uncured) elastomer used to manufacture a synthetic rubber article will be selected with reference to the specific end use application and environment under which the finished article must function. For example, one will select different elastomers from among ethylene alkyl acrylate copolymer rubbers, ethylene alpha-olefin copolymer elastomers, fluoroelastomers and chlorinated elastomers depending upon whether the finished article will be exposed to oils, water, fuels, acids or bases. One will also consider the temperature range to which the article will be subjected and special requirements such as flame resistance. In addition, consideration will be given to the cure characteristics of the polymer and the ease with which defect-free parts can be produced.

The majority of elastomeric seals manufactured on a commercial scale are crosslinked at high temperature in molding processes. Generally, elastomeric seals and gaskets thus produced are manually fitted onto an article to be sealed. Alternatively, adhesives are sometimes utilized to attach the cured sealing member to an article. Such attachment techniques are not completely satisfactory in all cases. In particular, manual methods are time consuming and adhesives can affect the physical properties of the seal.

Elastomeric gaskets are often utilized as sealing members for grooved parts, such as rocker covers and air intake manifolds, that are used in automobile engines. Such gaskets must be resistant to the effects of heat and oil. Traditionally, cured, oil-resistant elastomer compositions, such as ethylene alkyl acrylate copolymer rubbers, have been manually introduced into the groove of a metal part. Many automotive components are now formed from high performance thermoplastic materials, rather than from metal. Manual fitting of elastomeric seals onto these components is time-consuming, but curing the seal in place is impractical because either the cure temperature or, in some cases, the post cure temperature, is usually high enough to cause deformation of the thermoplastic. Yet, if the cure temperature is lowered, cure rate is too slow to be practical. Oil or fuel resistant elastomeric compositions that could be readily applied to an article or groove in their uncured state and that are adapted to low temperature curing techniques would therefore be especially useful in manufacture of thermoplastic articles having attached sealing members for automotive or industrial uses.

Low temperature curing processes that are initiated by high energy radiation, such as electron beam or γ-radiation, are known for use with almost any elastomer, including ethylene acrylate copolymer elastomers. For example, electron beam crosslinking of wire and cable insulation compositions, including elastomeric compositions, is disclosed in E. Brandt and A. Berejka, *Electron Beam Crosslinking of Wire and Cable Insulation*, Rubber World, 49, November 1978. Eldred, in U.S. Pat. No. 3,950,238, discloses the use of electron beam radiation to cure acrylonitrile butadiene polymers and Clarke, in U.S. Pat. No. 4,275,180, discloses the use of electron beam radiation cure of a blend of an ethylene acrylate copolymer rubber and a thermoplastic polymer, e.g. for cable jacketing. Electron beam cures have the disadvantage of requiring quite complex and expensive equipment for generating high energy particles. It would therefore be advantageous to have available a low temperature curing process that did not rely on the use of electron beam radiation. Low temperature UV cures of a variety of polymers, including ethylene acrylate polymers, are disclosed in U.S. Pat. No. 4,863,536. However, the disclosed process involves dissolution of the particular polymer in an acrylate monomer and is not suitable for preparation of general rubber goods, such as gaskets and seals.

In addition to having available an effective low temperature cure process for ethylene acrylate copolymer elastomers, it would also be advantageous to have available similar curing techniques for use with other elastomers as well. As is the case with ethylene acrylate copolymers, typical curing processes for fluoroelastomers are based on high temperature compression molding or transfer molding techniques. Products made using such processes include seals, gaskets, tubing, and other general rubber goods. In addition, textile composites coated with fluoroelastomers are available commercially and are generally subjected to a baking process during fabrication, for example as disclosed in U.S. Pat. No. 4,770,927 to Effenberger et al.

Low temperature radiation curing processes for fluoroelastomers are known in the prior art. For example, a stain-resistant protective fluoroelastomer coating composition for flooring that is curable using UV radiation is disclosed in European Patent Application 570254. UV cure of epoxy-containing fluorinated copolymers is described in Japanese Kokai Patent Application 5-302058. In addition, UV or electron beam cures of certain fluoroelastomer compositions that are normally cured with a polyol or polyamine crosslinking agent are disclosed in German Patent 19642029 and in Japanese Kokai Patent Application 61-031411. Blends of fluoroplastics and ethylene vinyl acetate copolymers or ethylene acrylic acid ester copolymers that are cured with UV radiation are disclosed in Japanese Kokai Patent Application 5-078539.

These prior art compositions possess interesting properties, but they do not provide compositions that exhibit the tensile strength, modulus, and compression set that is required in many commercial applications, for example air intake manifold gaskets. There thus remains a need in the art for fluoroelastomer compositions that can be cured at low temperature by low energy radiation processes and that, when cured, exhibit excellent tensile strength, modulus, and compression set.

Similarly, chlorinated elastomers such as chlorinated polyethylene, chlorosulfonated polyethylene and epichlorohydrin rubber, are traditionally crosslinked thermally by either ionic or free radical cure systems in compression molds. Extended high temperature exposure of curable compositions containing these polymers can be problematic due to the tendency of these polymers to dehydrochlorinate. Because of the high cure temperatures required, these elastomers have little utility in applications involving formation of elastomer/thermoplastic composites that are cured in place. Just as with ethylene alkyl acrylate elastomers, manufacture of chlorinated elastomer/thermoplastic composite articles requires an elastomer that can be cured at a temperature sufficiently low to preclude deformation of the thermoplastic. Low temperature UV cures of chlorinated polyolefin coating compositions are known. U.S. Pat. No. 4,880,849 discloses a UV-curable chlorinated polyolefin coating having excellent adhesion to plastic substrates. Japanese Kokai Patent Application 63-267517 discloses UV cure of chlorosulfonated polyethylene rubber and epichlorohydrin hose that is first passed through a UV irradiation apparatus and then vulcanized at elevated temperature for 30–60 minutes. However, chlorinated elastomer compositions that could be readily applied to a groove or an article in their uncured state and that are adapted to low temperature curing techniques are not known in the prior art.

There is thus a need for a method by which an elastomeric sealing composition may be applied to a substrate in an efficient, adhesive-free manner and cured at low temperature to produce a cured seal that has an excellent balance of tensile strength, modulus and compression set.

SUMMARY OF THE INVENTION

The present invention is directed to curable elastomeric compositions that are capable of being crosslinked at low temperatures. In particular, the present invention is directed to a thermally stable, curable elastomer composition comprising
  a) 75 to 95 weight percent of an elastomer selected from the group consisting of
    1) copolymers comprising ethylene and a comonomer selected from the group consisting of $C_1$–$C_8$ alkyl esters of acrylic acid, $C_1$–$C_8$ alkyl esters of methacrylic acid, and vinyl esters of $C_2$–$C_8$ carboxylic acids;
    2) alkyl acrylate polymers selected from the group consisting of homopolymers of $C_1$–$C_{10}$ alkyl acrylates and copolymers of $C_1$–$C_{10}$ alkyl acrylates with up to 40 weight percent monovinyl monomers; and
    3) diene copolymers selected from the group consisting of copolymers of a diene and an unsaturated nitrile and hydrogenated copolymers of a diene and an unsaturated nitrile;
  b) 2 to 24 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
  c) 0.2 to 5.0 weight percent of a UV initiator wherein the weight percentages of each of components a), b), and c) are based on the combined weight of components a), b), and c).

The invention is further directed to a process for applying a seal to an article comprising the steps of
  A) blending at a temperature of between 25° C. and 250° C.
    1) 75 to 95 weight percent of an elastomer selected from the group consisting of
      a) copolymers comprising ethylene and a comonomer selected from the group consisting of $C_1$–$C_8$ alkyl esters of acrylic acid, $C_1$–$C_8$ alkyl esters of methacrylic acid, and vinyl esters of $C_2$–$C_8$ carboxylic acids;
      b) alkyl acrylate polymers selected from the group consisting of homopolymers of $C_1$–$C_{10}$ alkyl acrylates and copolymers of $C_1$–$C_{10}$ alkyl acrylates with up to 40 weight percent monovinyl monomers; and
      c) diene copolymers selected from the group consisting of copolymers of a diene and an unsaturated nitrile and hydrogenated copolymers of a diene and an unsaturated nitrile;
    2) 2 to 24 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
    3) 0.2 to 5.0 weight percent of a UV initiator wherein the weight percentages of each of components 1), 2), and 3) are based on the combined weight of components 1), 2), and 3), to form a thermally stable, curable, extrudable mixture;
  B) depositing said extrudable mixture on said article in the shape and thickness desired to form an uncured seal; and
  C) irradiating said uncured seal with UV radiation for a time sufficient to cure said seal.

The present invention is also directed to curable fluoroelastomer compositions that are capable of being crosslinked at low temperatures. In particular, the present invention is directed to a thermally stable, curable elastomer composition comprising
  A) 70 to 99 weight percent of a fluoroelastomer having at least one cure site selected from the group consisting of 1) copolymerized brominated olefins, chlorinated olefins and iodinated olefins; 2) copolymerized brominated unsaturated ethers, chlorinated unsaturated ethers, and iodinated unsaturated ethers; 3) copolymerized non-conjugated dienes and trienes and 4) iodine atoms, bromine atoms and mixtures thereof that are present at terminal positions of the fluoroelastomer chain;
  B) 0.5 to 20 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
  C) 0.1 to 10 weight percent of a UV initiator wherein the weight percentages of each of components A), B), and C) are based on the combined weight of components A), B), and C).

The invention is further directed to a process for applying a seal to an article comprising the steps of A) blending at a temperature of between 25° C. and 250° C.
  1) 70 to 99 weight percent of a fluoroelastomer;
  2) 0.5 to 20 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
  3) 0.1 to 10 weight percent of a UV initiator wherein the weight percentages of each of components 1), 2), and 3) are based on the combined weight of components 1), 2), and 3), to form a thermally stable, curable, extrudable mixture;
B) depositing said extrudable mixture on said article in the shape and thickness desired to form an uncured seal; and
C) irradiating said uncured seal with UV radiation for a time sufficient to cure said seal.

The present invention is also directed to curable chlorinated elastomer compositions that are capable of being crosslinked at low temperatures. In particular, the present invention is directed to a thermally stable, curable elastomer composition consisting essentially of
  A) 80 to 97 weight percent of a chlorinated elastomer selected from the group consisting of chlorinated polyolefin elastomers and epichlorohydrin elastomers;
  B) 2 to 19.5 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
  C) 0.2 to 5.0 weight percent of a UV initiator wherein the weight percentages of each of components A), B), and C) are based on the combined weight of components A), B), and C).

In one embodiment, the chlorinated olefin polymer is a chlorosulfonated olefin polymer.

The invention is further directed to a process for applying a seal to an article comprising the steps of
  A) blending at a temperature of between 25° C. and 250° C.
    1) 80 to 97 weight percent of a chlorinated elastomer selected from the group consisting of chlorinated polyolefin elastomers and epichlorohydrin elastomers;
    2) 2 to 19.5 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
    3) 0.2 to 5.0 weight percent of a UV initiator wherein the weight percentages of each of components 1), 2), and 3) are based on the combined weight of components 1), 2), and 3), to form a thermally stable, curable, extrudable mixture;
  B) depositing said extrudable mixture on said article in the shape and thickness desired to form an uncured seal; and
  C) irradiating said uncured seal with UV radiation for a time sufficient to cure said seal.

In addition, the present invention is directed to a process for applying a seal to an article comprising the steps of
  A) blending at a temperature of between 25° C. and 250° C.
    1) 80–98 weight percent of an ethylene alpha-olefin copolymer comprising ethylene and a $C_3$–$C_{20}$ alpha-olefin;
    2) 1–19.5 weight percent of a multifunctional crosslinking agent selected from the group consisting of multifunctional acrylic crosslinking agents and multifunctional methacrylic crosslinking agents; and
    3) 0.2–5 weight percent of a UV initiator wherein the weight percentages of each of components 1), 2), and 3) are based on the combined weight of components 1), 2), and 3), to form a thermally stable, curable, extrudable mixture;
  B) depositing said extrudable mixture on said article in the shape and thickness desired to form an uncured seal; and
  C) irradiating said uncured seal with UV radiation for a time sufficient to cure said seal.

The invention is also directed to cured articles produced by these processes.

DETAILED DESCRIPTION OF THE INVENTION

The thermally stable, curable compositions of the present invention comprise an elastomer; a multifunctional crosslinking agent, generally an acrylic or methacrylic crosslinking agent; and a UV initiator. These curable compositions are utilized as starting materials in the process for applying a seal to an article that is a further embodiment of the invention. In preferred embodiments of the process of the invention, the elastomer, multifunctional crosslinking agent and UV initiator are present as three separate components. However, the UV initiator may be present as a chemically combined component with the elastomer. That is, the UV initiator may be chemically incorporated into the elastomeric component as a polymer-bound photoinitiator. Such polymer-bound photoinitiators are disclosed, for example in U.S. Pat. No. 5,128,386 wherein a photoinitiator is described that is copolymerized with an acrylate copolymer.

The compositions are curable by the action of UV radiation. They are thermally stable at temperatures used to process uncured elastomer formulations, e.g. in mixing or extruding operations. Such temperatures generally range from 25° C. to 250° C. By thermally stable is meant that the compositions do not spontaneously form a crosslinked network, i.e. they do not prematurely cure or scorch. That is, the viscosity of the compositions remains constant, within ±50% of the initial value when heated to the processing temperature, as indicated by lack of a substantial increase in torque (i.e. an increase of less than 1 dNm) when subjected to the processing temperature for 30 minutes in a Moving Die Rheometer. The appropriate processing temperature will depend on the decomposition temperature of the particular UV initiator and multifunctional crosslinking agent that is employed. However, the processing temperature must be sufficiently high so that the curable elastomer composition flows to the degree required for the production process. This temperature will generally be from 25° C. to 250° C., preferably from 90° C. to 170° C. The compositions, when heated or subjected to mechanical working, such as in a screw extruder, gear pump, or piston pump, are capable of viscoelastic flow and may be metered and formed into shaped articles, such as seals. These articles may then be cured by exposure to UV radiation.

The elastomeric component of the thermally stable compositions of the invention may be any of the members of the following classes of raw (i.e. uncured) elastomeric polymers: ethylene acrylate copolymer rubbers, ethylene methacrylate copolymer rubbers, acrylate rubbers, ethylene vinyl ester elastomers, elastomeric copolymers of a diene and an unsaturated nitrile (i.e., nitrile rubber and hydrogenated nitrile), fluoroelastomers having copolymerized units of iodinated, brominated, or chlorinated cure site monomers, fluoroelastomers having copolymerized units of non-conjugated dienes, fluoroelastomers having bromine or iodine atoms at terminal positions of the fluoroelastomer, chlorinated olefin elastomers, chlorosulfonated olefin elastomers, and epichlorohydrin elastomers.

One class of ethylene copolymer rubbers useful in the composition and process of the invention is made up of two types of ethylene ester copolymers. The first type includes ethylene copolymers having copolymerized units of $C_1$–$C_8$ alkyl esters of acrylic acid or $C_1$–$C_8$ alkyl esters of methacrylic acid. The second type includes ethylene copolymers having copolymerized units of vinyl esters of $C_2$–$C_8$ carboxylic acids. Each of these types of copolymers includes dipolymers or higher order copolymers having copolymerized units of other comonomers.

When the copolymers are dipolymers, the ethylene content ranges from about 20–85 weight percent, preferably 30–65 weight percent. Representative examples of such compositions include copolymers of ethylene with, for example, methyl acrylate, ethyl acrylate, n-butyl acrylate, isobutyl acrylate, 2-ethylhexyl acrylate, hexyl acrylate, and copolymers of ethylene with, for example, vinyl acetate, vinyl propionate, and vinyl hexanoate. Copolymers of ethylene with, for example, methyl methacrylate, ethyl methacrylate, isobutyl methacrylate, 2-ethylhexyl methacrylate, n-butyl methacrylate, or hexyl methacrylate may also be employed, but ethylene acrylate copolymers and ethylene vinyl ester copolymers are preferred. Methyl acrylate, n-butyl acrylate, and vinyl acetate are among the most preferred comonomers. The copolymers generally have Mooney viscosities ranging from 1–60, ML 1+4 (100° C.), preferably 1–20, ML 1+4 (100° C.). Blends of dipolymers may also be utilized.

Examples of higher order types of the foregoing elastomeric copolymers of ethylene which are suitable for use as the polymeric component of the compositions of the present invention include copolymers of a) ethylene, b) alkyl acrylates, alkyl methacrylates, or vinyl esters of carboxylic acids, and c) unsaturated acids. Specific examples include terpolymers having copolymerized units of a) ethylene, b) $C_1$–$C_8$ alkyl esters of acrylic acid, $C_1$–$C_8$ alkyl esters of methacrylic acid, or vinyl esters of $C_2$–$C_8$ carboxylic acids and c) carboxylic acids of 3–12 carbon atoms selected from the group consisting of alpha, beta-unsaturated monocarboxylic acids; alpha, beta-unsaturated dicarboxylic acids; and monoesters of alpha, beta-unsaturated dicarboxylic acids. The ethylene content of the copolymers ranges from about 25–70 weight percent of the polymer, preferably 35–65 weight percent, and the alpha, beta-unsaturated mono- or dicarboxylic acids or monoesters of alpha, beta-unsaturated acids are present in an amount sufficient to provide 0.1–10 weight percent, preferably 0.5–5.0 weight percent, of carboxylic acid groups. Suitable alpha, beta-unsaturated mono-or dicarboxylic acids include monocarboxylic acids such as acrylic acid and methacrylic acid; dicarboxylic acids, such as maleic acid, fumaric acid, and itaconic acid; and monoesters of dicarboxylic acids such as ethyl hydrogen maleate, ethyl hydrogen fumarate, and 2-ethylhexyl hydrogen maleate. Acrylic acid, methacrylic acid, and ethyl hydrogen maleate are preferred. The alkyl acrylate or the vinyl ester comonomers comprise 25–70 weight percent of the polymer, preferably 30–65 weight percent. Alkyl acrylates suitable for use in the polymers include $C_1$–$C_8$ alkyl esters of acrylic acid, for example, the methyl, ethyl, n-butyl, isobutyl, hexyl, and 2-ethylhexyl esters. Methyl, ethyl, and butyl acrylates are preferred. Methyl acrylate is most preferred. Vinyl esters of carboxylic acids suitable for use in the polymers include vinyl esters of carboxylic acids having 2–8 carbon atoms, for example, vinyl acetate, vinyl propionate, vinyl hexanoate, and vinyl 2-ethylhexanoate. Vinyl acetate is preferred. Mooney viscosities, ML 1+4 (100° C.), of these copolymers generally range from 1–50, preferably 1–20. Representative examples of such copolymers include terpolymers and tetrapolymers such as ethylene/methyl acrylate/methacrylic acid copolymers; ethylene/methyl acrylate/ethyl hydrogen maleate copolymers; ethylene/acrylic acid/vinyl acetate copolymers; ethylene/butyl acrylate/acrylic acid copolymers; ethylene/vinyl acetate/methacrylic acid copolymers; ethylene/fumaric acid/methyl acrylate copolymers; ethylene/methyl acrylate/carbon monoxide/methacrylic acid copolymers; and ethylene/ethyl hydrogen maleate/carbon monoxide/vinyl acetate copolymers. Copolymer blends may also be utilized.

Another polymer type in this class of elastomeric ethylene copolymers suitable for use in the practice of the invention contains copolymerized units of ethylene, an acrylic ester or vinyl ester, glycidyl acrylate or methacrylate, and optionally, carbon monoxide. Generally, such compositions contain from 30–70 weight percent ethylene, 25–65 weight percent acrylic or vinyl ester, 2–10 weight percent glycidyl acrylate or methacrylate, and 0–15 weight percent carbon monoxide, the weight percentages adding up to 100 weight percent. Copolymers of ethylene, acrylate ester, and glycidyl methacrylate are preferred. Representative alkyl acrylates and alkyl acrylates that are used as comonomers include methyl acrylate, ethyl acrylate, propyl acrylate, n-butyl acrylate, isobutyl acrylate, and hexyl acrylate. Representative copolymers include ethylene/methyl acrylate/glycidyl methacrylate; ethylene/n-butyl acrylate/glycidyl methacrylate; ethylene/vinyl acetate/glycidyl methacrylate; and ethylene/methyl acrylate/carbon monoxide/glycidyl methacrylate.

A further polymer type in this class of elastomeric ethylene copolymers suitable for use in the practice of the invention contains copolymerized units of a) ethylene; b) vinyl acetate, a $C_1$–$C_8$ alkyl acrylate or a $C_1$–$C_8$ alkyl methacrylate; and c) carbon monoxide or sulfur dioxide. The vinyl acetate, alkyl acrylate or alkyl methacrylate content of the copolymer is generally 20–50 weight percent and the carbon monoxide or sulfur dioxide content is generally 5–40 weight percent. Examples of such copolymers include ethylene/vinyl acetate/carbon monoxide; ethylene/n-butyl acrylate/carbon monoxide; ethylene/methyl acrylate/carbon monoxide; and ethylene/ethyl hydrogen maleate/carbon monoxide/vinyl acetate.

Both the dipolymers and higher copolymers described above are generally prepared by continuous copolymerization of ethylene and the comonomers in a stirred reactor in the presence of at least one free radical initiator at temperatures of from about 100° C. to 300° C. and at pressures of from about 130 to 350 MPa, generally as described in U.S. Pat. No. 3,883,472. Most preferably the copolymers are also prepared in the presence of about 2–25 weight percent methanol or acetone so that reactor fouling is decreased or eliminated.

The elastomeric component may also be selected from the class of acrylate rubbers comprising homopolymers or copolymers of $C_1$–$C_{10}$ alkyl acrylates. Preferred alkyl acrylates include ethyl acrylate, butyl acrylate, and 2-ethylhexyl acrylate. Copolymeric acrylate rubbers contain copolymerized units of up to 40 weight percent monovinyl monomers, for example, styrene, acrylonitrile, vinylbutyl ether, acrylic acid, and $C_1$–$C_{10}$ alkyl acrylates different from the principal alkyl acrylate comonomer. Such copolymers are available commercially, for example, Hytemp® acrylate rubbers (acrylic homopolymer and copolymer rubbers available from Nippon Zeon, KK), and Toacron® AR-601 acrylate rubbers (polyethylacrylate polymers, available from Toa Paint, KK.).

Further, the elastomeric component may be a copolymer of a diene and an unsaturated nitrile. The diene may be, for example, butadiene. The nitrile is preferably acrylonitrile. Such copolymers are known as nitrile rubbers and are commercially available. They generally have acrylonitrile contents of 18–50 wt. %. Hydrogenated nitrile rubbers are also suitable for use in the compositions of the invention.

Fluoroelastomers suitable for use as the elastomeric component of the compositions of the invention include fluoroelastomers comprising copolymerized units of one or more monomers containing fluorine, such as vinylidene fluoride, hexafluoropropylene, 1-hydropentafluoropropylene, 2-hydropentafluoropropylene, tetrafluoroethylene, chlorotrifluoroethylene, and perfluoro(alkyl vinyl) ether, as well as other monomers not containing fluorine, such as ethylene, and propylene. Elastomers of this type are described in Logothetis, *Chemistry of Fluorocarbon Elastomers*, Prog. Polym. Sci., Vol. 14, 251–296 (1989). The polymers may be prepared by polymerization of the appropriate monomer mixtures with the aid of a free radical generating initiator either in bulk, in solution in an inert solvent, in aqueous emulsion or in aqueous suspension. The polymerizations may be carried out in continuous, batch, or in semi-batch processes. General preparative processes are disclosed in the Logothetis article and in U.S. Pat. Nos. 4,281,092; 3,682,872; 4,035,565; 5,824,755; 5,789,509; 3,051,677; and 2,968,649.

Specific examples of such fluoroelastomers include copolymers of vinylidene fluoride and hexafluoropropylene and, optionally, tetrafluoroethylene; copolymers of vinylidene fluoride and chlorotrifluoroethylene; copolymers of vinylidene fluoride, hexafluoropropylene, tetrafluoroethylene and chlorotrifluoroethylene; copolymers of tetrafluoroethylene and propylene; and copolymers of tetrafluoroethylene and perfluoro(alkyl vinyl) ether, preferably perfluoro (methyl vinyl) ether. Each of the fluoroelastomers of the composition of the invention also comprises at least one halogenated cure site or a reactive double bond resulting from the presence of a copolymerized unit of a non-conjugated diene. The halogenated cure sites may be copolymerized cure site monomers or halogen atoms that are present at terminal positions of the fluoroelastomer polymer chain. The cure site monomers, reactive double bonds or halogenated end groups are capable of reacting to form crosslinks. The cure site monomers are selected from the group consisting of brominated, chlorinated, and iodinated olefins; brominated, chlorinated, and iodinated unsaturated ethers and non-conjugated dienes.

The brominated cure site monomers may contain other halogens, preferably fluorine. Examples are bromotrifluoroethylene, 4-bromo-3,3,4,4-tetrafluorobutene-1 and others such as vinyl bromide, 1-bromo-2,2-difluoroethylene, perfluoroally bromide, 4bromo- 1,1,2-trifluorobutene, 4-bromo-1,1,3,3,4,4,-hexafluorobutene, 4-bromo-3-chloro-1,1,3,4,4-pentafluorobutene, 6-bromo-5,5,6,6-tetrafluorohexene, 4-bromoperfluorobutene- 1 and 3,3-difluoroallyl bromide. Brominated unsaturated ether cure site monomers useful in the invention include ethers such as 2-bromo-perfluoroethyl perfluorovinyl ether and fluorinated compounds of the class $CF_2Br$-$R_fO$—$CF$=$CF_2$, such as $CF_2BrCF_2O$—$CF$=$CF_2$, and fluorovinyl ethers of the class $ROCF$=$CFBr$ or $ROCBr$=$CF_2$, where R is a lower alkyl group or fluoroalkyl group, such as $CH_3OCF$=$CFBr$ or $CF_3CH_2\ OCF$=$CFBr$.

Iodinated olefins may also be used as cure site monomers. Suitable iodinated monomers include iodinated olefins of the formula: $CHR$=$CH$-$Z$-$CH_2CHR$-$I$, wherein R is —H or —$CH_3$; Z is a $C_1$–$C_{18}$ (per)fluoroalkylene radical, linear or branched, optionally containing one or more ether oxygen atoms, or a (per)fluoropolyoxyalkylene radical as disclosed in U.S. Pat. No. 5,674,959. Other examples of useful iodinated cure site monomers are unsaturated ethers of the formula: $I(CH_2CF_2CF_2)_nOCF$=$CF_2$ and $ICH_2CF_2O[CF(CF_3)CF_2O]_nCF$=$CF_2$, and the like, wherein n=1–3, such as disclosed in U.S. Pat. No. 5,717,036. In addition, suitable iodinated cure site monomers including iodoethylene, 4-iodo-3,3,4,4-tetrafluorobutene-1; 3-chloro-4-iodo-3,4,4-trifluorobutene; 2-iodo-1,1,2,2-tetrafluoro- 1-(vinyloxy) ethane; 2- iodo-1-(perfluorovinyloxy)- 1,1,–2,2-tetrafluoroethylene; 1,1,2,3,3,3-hexafluoro-2- iodo-1-(perfluorovinyloxy)propane; 2-iodoethyl vinyl ether; 3,3,4,5,5,5-hexafluoro-4-iodopentene; and iodotrifluoroethylene, are disclosed in U.S. Pat. No. 4,694,045.

Examples of non-conjugated diene cure site monomers include 1,4-pentadiene, 1,5-hexadiene, 1,7-octadiene and others, such as those disclosed in Canadian Patent 2,067,891. A suitable triene is 8-methyl-4-ethylidene-1,7-octadiene.

Of the cure site monomers listed above, preferred compounds include 4-bromo-3,3,4,4-tetrafluorobutene-1; 4-iodo-3,3,4,4-tetrafluorobutene-1; and bromotrifluoroethylene.

Additionally, or alternatively, iodine, bromine or mixtures thereof may be present at the fluoroelastomer chain ends as a result of the use of chain transfer or molecular weight regulating agents during preparation of the fluoroelastomers. Such agents include iodine-containing compounds that result in bound iodine at one or both ends of the polymer molecules. Methylene iodide; 1,4-diiodoperfluoro-n-butane; and 1,6-diiodo-3,3,4,4,tetrafluorohexane are representative of such agents. Other iodinated chain transfer agents include 1,3-diiodoperfluoropropane; 1,4-diiodoperfluorobutane; 1,6-diiodoperfluorohexane; 1,3-diiodo-2-chloroperfluoropropane; 1,2-di(iododifluoromethyl)-perfluorocyclobutane; monoiodoperfluoroethane; monoiodoperfluorobutane; 2-iodo -1-hydroperfluoroethane; etc. Particularly preferred are diiodinated chain transfer agents. Examples of brominated chain transfer agents include 1-bromo-2-iodoperfluoroethane; 1-bromo-3-iodoperfluoropropane; 1-iodo-2-bromo-1,1-difluoroethane and others such as disclosed in U.S. Pat. No. 5,151,492.

Copolymers of ethylene, tetrafluoroethylene, perfluoro (alkyl vinyl) ether and a bromine-containing cure site monomer, such as those disclosed by Moore, in U.S. Pat. No. 4,694,045 are suitable for use in the present invention. Copolymers of tetrafluoroethylene and perfluoro(alkyl vinyl) ether commonly containing fluorinated nitrile cure sites, for example perfluoro(8-cyano-5-methyl-3,6-dioxa-1-octene) and others disclosed in U.S. Pat. No. 4,983,697, may also be used. Other useful fluoroelastomers containing brominated or iodinated olefin cure site monomers are described in U.S. Pat. Nos. 4,035,565; 4,564,662; 4,745,165; 4,694,045; 4,948,852; and 4,973,633.

Each of these classes of copolymers includes dipolymers or higher order copolymers having copolymerized units of other comonomers.

It has been found that raw fluoroelastomers having Mooney viscosities in the range of 5–150, ML 1+4 (121° C.), preferably 10–70, ML 1+4 (121° C.), a particularly useful in the compositions of the present invention. Those compositions wherein the fluoroelastomer has a Mooney viscosity within the preferred range exhibit an optimum balance of processability and tensile properties.

It has also been found that compositions containing fluoroelastomers having levels of copolymerized cure site monomer units within the range of 0.05–10.0 wt. % exhibit enhanced cure state.

Chlorinated olefin polymers are also suitable for use as the elastomeric component of the compositions of the invention. The chlorinated olefin polymers also specifically include chlorosulfonated olefin polymers. By olefin polymers is meant homopolymers and copolymers of $C_2$–$C_8$ alpha-monoolefins, including graft copolymers. The copolymers may be dipolymers or higher order copolymers, such as terpolymers or tetrapolymers. The olefin polymers may be branched or unbranched and may be prepared by free radical processes, Ziegler-Natta catalysis or catalysis with metallocene catalyst systems, for example those disclosed in U.S. Pat. Nos. 5,272,236 and 5,278,272. Particularly useful examples 30 of olefin polymers include homopolymers of $C_2$–$C_3$ alpha monoolefins, copolymers of ethylene and carbon monoxide, and copolymers of ethylene and at least one ethylenically unsaturated monomer selected from the group consisting of $C_3$–$C_{20}$ alpha monoolefins, $C_1$–$C_{12}$ alkyl esters of unsaturated $C_3$–$C_{20}$ monocarboxylic acids, unsaturated $C_3$–$C_{20}$ mono- or dicarboxylic acids, anhydrides of unsaturated $C_4$–$C_8$ dicarboxylic acids, and vinyl esters of saturated $C_2$–$C_{18}$ carboxylic acids. Specific examples of these polymers include polyethylene, polypropylene, ethylene vinyl acetate copolymers, ethylene acrylic acid copolymers, ethylene methacrylic acid copolymers, ethylene methyl acrylate copolymers, ethylene methyl methacrylate copolymers, ethylene n-butyl methacrylate copolymers, ethylene glycidyl methacrylate copolymers, graft copolymers of ethylene and maleic anhydride, graft copolymers of propylene and maleic anhydride, and copolymers of ethylene with propylene, butene, 3-methyl-1-pentene, hexene, or octene. Preferred olefin polymers are polyethylene, ethylene propylene copolymers, ethylene butene copolymers, ethylene octene copolymers, copolymers of ethylene and acrylic acid, copolymers of ethylene and methacrylic acid, and copolymers of ethylene and vinyl acetate. The olefin polymers have number average molecular weights within the range of 1,000 to 300,000, preferably from 50,000 to 300,000. The chlorinated and chlorosulfonated olefin polymers have chlorine contents of from about 15 weight percent to about 70 weight percent. The chlorosulfonated olefin polymers have sulfur contents of 0.5–10 weight percent, preferably 1–3 weight percent.

The chlorinated or chlorosulfonated olefin polymers may be prepared from the olefin polymers by free radical initiated chlorination and chlorosulfonation. Chlorination of the olefin polymers may take place at temperatures of 50° C.–150° C. and at pressures of 1–10 atmospheres using gaseous chlorine as the chlorinating agent. In solution chlorination, the reaction medium is an inert solvent, for example carbon tetrachloride, chlorinated benzene, chloroform or fluorobenzene. Alternatively, slurry chlorination in aqueous or organic suspension can be used. Fluidized bed processes are also known, as well as melt processes. Chlorosulfonation of the olefin polymer starting materials may take place in solution, under similar conditions, utilizing gaseous chlorine and sulfur dioxide, sulfuryl chloride, or a combination of chlorine, sulfur dioxide and sulfuryl chloride. Commercially available chlorinated and chlorosulfonated olefin polymers include Tyrin® chlorinated polyethylene, Hypalon® chlorosulfonated polyethylene, and Acsium® chlorosulfonated polyethylene, all available from DuPont Dow Elastomers L.L.C.

Epichlorohydrin elastomers that are suitable for use as the elastomeric component of the compositions of the invention include both polyepichlorohydrin homopolymers and copolymers comprising copolymerized units of epichlorohydrin and ethylene oxide. Terpolymers containing cure site monomers, such as allyl glycidyl ether, may also be used. Such compositions generally contain about 20–45 wt. % chlorine. Commercially available examples include Epichlomer® rubber manufactured by Daiso Epichlo Rubber Co., Ltd., Japan and Hydrin® epichlorohydrin rubber manufactured by Nippon Zeon Co., Ltd., Japan.

The elastomeric component of the compositions of the invention may be a blend of elastomers as well as a single elastomer. The blends may be mixtures of polymers of the same class, for example, a brorninated fluoroelastomer and an iodinated fluoroelastomer, or they may be mixtures of more than one type of elastomer, for example a chlorinated polyolefin rubber and an ethylene copolymer rubber. Blends wherein only one elastomer is capable of cure by exposure to UV radiation are also contemplated by the invention. Blend compositions would be particularly useful for balancing physical properties. For example, it would be desirable to balance state of cure with fuel resistance by blending fluoroelastomers with epichlorohydrin rubbers. In other circumstances, blends of costly polymers with less expensive polymers often yield a combination of properties that are adequate for less demanding applications. In this context, blends of fluoroelastomers and nitrile rubber or fluoroelastomers and ethylene acrylate copolymer elastomers would be suitable for use as the elastomeric component of the compositions of the invention. The Mooney viscosities of the blends will preferably be within the range of 1–150 because within this range the blends will be suitable for use in the process of the present invention for producing general rubber articles, such as seals.

In addition to an elastomeric component, the curable compositions of the invention also include at least one multifunctional crosslinking agent. Preferably the multifunctional crosslinking agent will be an acrylic or methacrylic crosslinking agent. In addition, it may be a multifunctional cyanurate or multifunctional isocyanurate, such as triallyl isocyanurate or triallyl cyanurate. By multifunctional acrylic or methacrylic crosslinking agent is meant an ester that is a reaction product of a polyhydroxylic compound, generally a polyhydroxylic alcohol, and acrylic acid or methacrylic acid, wherein the crosslinking agent has at least two carbon-carbon double bonds. Such compositions are commonly referred to in the art as multifunctional acrylates or multifunctional methacrylates. Typical multifunctional acrylates and methacrylates have molecular weights of 150 to 1,000 and contain at least two polymerizable unsaturated groups per molecule.

Representative multifunctional acrylic crosslinking agents include acrylates and methacrylates such as ethylene glycol diacrylate; ethylene glycol dimethacrylate; 1,6-hexanediol diacrylate; 1,6-hexanediol dimethacrylate; 1,4-butanediol diacrylate; pentaerythritol triacrylate; pentaerythritol tetraacrylate; dipentaerythritol pentaacrylate, methoxy-1,6hexanediolpentaerythritol triacrylate; trimethylolpropane triacrylate; tetraethylene glycol diacrylate; polymethacrylate urethanes; epoxy acrylates; polyester acrylate monomers and oligomers; trimethylolpropane propoxylate triacrylate; poly-n-butyleneoxide glycol diacrylates; and bisphenol A alkylene oxide adduct diacrylates. Trimethylolpropane triacrylate and trimethylolpropane trimethacrylate are preferred crosslinking agents because these compounds are readily available. In addition, compression set and crosslink density are enhanced in compositions containing these crosslinking agents compared to compositions containing difunctional acrylates, such as diethylene glycol dimethacrylate.

The multifunctional acrylic and methacrylic crosslinking agents are capable of homopolymerization when irradiated. Thus, when the curable compositions of the invention that contain multifunctional acrylates or methacrylates are exposed to UV radiation, two reactions occur simultaneously. The multifunctional crosslinking agent reacts with the elastomeric polymer component to form interchain and intrachain crosslinks, resulting in a rubber matrix. In addition, excess multifunctional crosslinking agent will homopolymerize and form an interpenetrating network which acts to reinforce the rubber matrix, much in the same manner as fillers reinforce elastomers. It is therefore possible to control the hardness of the final cured product by adjusting the proportion of multifunctional crosslinker present in the curable composition. In general, difunctional acrylates and methacrylates are less efficient crosslinking agents compared to their analogues having higher functionalities. Consequently, crosslinking agents of the class having higher functionalities are preferred for purposes of the present invention.

Elastomeric materials compounded and cured according to methods commonly used in rubber processing technology generally contain carbon black or mineral fillers as reinforcing agents. Reinforcement is reflected in properties such as hardness, modulus, and tensile strength. Generally, reinforced elastomers are characterized by non-1 inear stress/strain dependence. In contrast, non-reinforced elastomer compositions are characterized by an initial stress build-up at low deformation which does not substantially increase at higher deformation. Further, non-reinforced elastomer compositions tend to break at relatively low ultimate tensile strength.

Use of fillers in UV-initiated reactions would normally be expected to interfere with the UV curing process. However, the present process permits curing of translucent compositions. Thus, the compositions of the present invention may contain a limited amount of fillers, generally no more than 15 parts by weight per 100 parts polymer. Reinforcement is effected simultaneously with crosslinking by formation of an interpenetrating network. The resultant product exhibits stress/strain behavior that is more linear than that of traditional elastomers which contain fillers which are not chemically bound to the elastomer matrix.

The amount of multifunctional crosslinking agent present in the compositions of the invention will depend on the particular elastomer used. Generally, the amount ranges from 0.5 to 25 weight percent, based on the combined weight of polymer, multifunctional crosslinking agent, and UV initiator.

The third component of the curable compositions of the invention is a UV initiator. It may be selected from those organic chemical compounds conventionally employed to promote UV-initiated formation of radicals either by intramolecular homolytic bond cleavage or by intermolecular hydrogen abstraction. Such agents include organic compounds having aryl carbonyl or tertiary amino groups. Among the compounds suitable for use are benzophenone; acetophenone; benzil; benzaldehyde; o-chlorobenzaldehyde; xanthone; thioxanthone; 9,10-anthraquinone; 1-hydroxycyclohexyl phenyl ketone; 2,2-diethoxyacetophenone; dimethoxyphenylacetophenone; methyl diethanolamine; dimethylaminobenzoate; 2-hydroxy-2-methyl- 1-phenylpropane-1-one; 2,2-di-sec-butoxyacetophenone; 2,2-dimethoxy- 1,2-diphenylethan-1-one; benzil dimethoxyketal; benzoin methyl ether; and phenyl glyoxal. Upon exposure to UV radiation, a variety of photochemical transformations may occur, for example, the UV initiator may form free radical reactive fragments that react with the acrylate end groups of the multifunctional acrylic or methacrylic crosslinking agent. This initiates crosslinking of the polymer as well as homopolymerization of the acrylic or methacrylic crosslinking agent. A preferred UV initiator is 1-hydroxycyclohexyl phenyl ketone because of the rapidity with which it generates free radicals when exposed to UV radiation. Mixtures of UV initiators may also be used. This is often desirable because it provides more efficient production of radicals in certain cases. In general, the UV initiator will be present in an amount of 0.1 to 10.0 weight percent, based on the total weight of polymer, multifunctional crosslinking agent, and UV initiator. However, it is preferable to use between 0.5–2.5 weight percent UV initiator, most preferably 0.5–1.0 weight percent UV initiator, based on total weight of polymer, crosslinking agent and UV initiator, because high levels of photoinitiator tend to interfere with penetration and do not substantially contribute to the overall crosslink density. Within the ranges disclosed herein, there is an optimum level of photoinitiator for each particular combination of uncured gum elastomer and crosslinking agent. These optimum levels can be readily determined by one skilled in the art. For example, hydrogenated nitrile rubber will generally require a higher level of photoinitiator than a copolymer of ethylene, methyl acrylate, and ethyl hydrogen maleate. Higher levels of photoinitiator increase the crosslink density at the surface of the cured composition. Low levels of photoinitiators can result in better (i.e. lower) compression sets of samples that are several millimeters thick.

In addition, for purposes of the present invention, the processing temperature must not exceed the temperature at which thermal degradation of the UV initiator occurs. In some cases such degradation would result in scorchy compositions due to formation of free radicals. This is so because thermally-induced fragmentation of the initiator within the processing equipment results in premature crosslinking of the elastomer. In other instances, slow curing compositions would result due to inactivation of the initiator. Degradation temperatures will differ for each particular UV initiator. Depending upon the type of rubber and the amount of additives, the processing temperature will range from between 25° and 250° C. It is an object of the invention to provide stable elastomeric compositions which can be applied to a substrate at temperatures of up to 250° C. A further practical limitation on the processing temperature is that the temperature must not exceed the softening point of the substrate to which it is applied.

The elastomeric component, multifunctional crosslinking agent component, and UV initiator component are present in the compositions of the present invention in specific relative ratios. When the elastomeric component of the composition is an ethylene copolymer elastomer, an acrylate rubber or a nitrile rubber, the elastomer is present in an amount of 75–95 weight percent, based on the total weight of elastomer, crosslinking agent, and UV initiator. The multifunctional crosslinking agent is present in an amount of 2 to 24 weight percent, based on the total weight of elastomer, crosslinking agent, and UV initiator. Finally, the UV initiator is present in an amount of 0.2 to 5.0 weight percent based on the total weight of elastomer, crosslinking agent, and UV initiator. Preferably, the elastomeric component will be present in an amount of from 87–95 weight percent, based on the total weight of elastomer, crosslinking agent, and UV initiator. The level of crosslinker determines compression set resistance and hardness in the curable composition of the invention. If less than 2 weight percent crosslinker is present, a composition having low hardness and poor compression set resistance is formed. Greater than 30 weight percent crosslinker results in production of a composition of hardness greater than 70 Shore A. Such compositions are generally unsuitable for use in sealing, especially gasketing, applications. The particular component range selected will thus depend on the specific end use contemplated. Preferred compositions contain 5–20 weight percent multifunctional crosslinking agent, and most preferred compositions contain 5–15 weight percent multifunctional crosslinking agent, based on the combined weight of polymer, multifunctional crosslinking agent and UV initiator.

When the elastomeric component of the composition is a fluoroelastomer, the elastomer is present in an amount of 70–99 weight percent, based on the total weight of elastomer, crosslinking agent, and UV initiator. The multifunctional crosslinking agent is present in an amount of 0.5–20 weight percent, based on the total weight of elastomer, crosslinking agent, and UV initiator. Finally, the UV initiator is present in an amount of 0.1–10 weight percent based on the total weight of elastomer, crosslinking agent, and UV initiator. Preferably, the elastomeric component will be present in an amount of from 75–95 weight percent, based on the total weight of elastomer, crosslinking agent, and UV initiator. The level of crosslinker determines compression set resistance and hardness in the curable composition of the invention. Preferably the multifunctional crosslinker is present in an amount of 4–15 weight percent based on the weight of elastomer, crosslinker and UV initiator. If less than about 4 weight percent crosslinker is present, a composition having fairly low hardness and relatively high compression set resistance is formed. Greater than about 15 weight percent crosslinker results in a cured composition of high modulus, low elongation at break, and poor compressability of the cured composition. Such compositions are less desirable for use in sealing, especially gasketing, applications. The particular component range selected will thus depend on the specific end use contemplated.

When chlorinated olefin polymers, chlorosulfonated olefin polymers or epichlorohydrin rubbers are used as the elastomeric component of the composition, the elastomer is present in an amount of 80–97 weight percent, based on the total weight of elastomer, crosslinking agent, and UV initiator. The multifunctional crosslinking agent is present in an amount of 2–19.5 weight percent, based on the total weight of elastomer, crosslinking agent, and UV initiator. The UV initiator is present in an amount of 0.2–5.0 weight percent based on the total weight of elastomer, crosslinking agent, and UV initiator. Preferably, the elastomeric component will be present in an amount of from 85–95 weight percent, based on the total weight of elastomer, crosslinking agent, and UV initiator. Preferably, the crosslinker will be present in an amount of 3–15 weight percent, based on the total weight of elastomer, crosslinking agent and UV initiator. If less than 3 weight percent crosslinker is present, a cured composition having relatively high compression set generally results. Greater than 15 weight percent crosslinker results in a high level of hompolymerized acrylic or methacrylic crosslinker producing a highly crosslinked elastomeric matrix of high hardness, low compressability and low elongation at break. As with the other compositions of the invention, the particular component range selected will thus depend on the specific end use contemplated.

Various additives, commonly used in rubber compounding, may be incorporated into the compositions of the present invention to modify, stabilize, and reinforce them. Preferably, such additives will be used in amounts which do not interfere substantially with the crosslinking reaction of the uncured polymeric component. For example, if large amounts of fillers that are opaque to UV light are utilized, the filled compositions will not cure evenly throughout, or only the surface of the composition will be cured. Usually, fillers may be employed in amounts of up to about 15 parts per hundred parts of elastomer. Typical examples include non-black fillers such as minerals or glass fibers. Polymeric fillers of high reinforcing efficiency, such as polytetrafluoroethylene and aramid fibers, may also be used, generally at low levels. It is preferable that the presence of additives does not raise the viscosity of the curable composition used in the process of the invention to more than ML 1+4 (100° C.) of 150 or lower it to less than ML 1+4 (100° C.) of 1. Compositions outside this range are not suitable for the gasketing in place process of the invention.

When the polymeric component is a fluoroelastomer, preferred curable compositions of the present invention will include 0.01–2.0 parts by weight per hundred parts by weight fluoroelastomer of an organotin hydride. Compositions wherein this additive is present exhibit excellent cure profiles. That is, the cure rate increases rapidly after initiation and the cure state remains high throughout the cure process. Preferably 0.1–1 parts by weight of the organotin hydride will be used per 100 parts by weight fluoroelastomer. Tri-n-butyltin hydride is preferred.

When ethylene acrylate copolymers are utilized as the polymeric component, heat and oxidation resistance of the compositions of the invention are preferably enhanced by incorporation of antioxidants. Generally, aromatic antioxidants are utilized, especially aromatic amines. Due to their protective action, these compounds interfere to a certain extent with the free radical crosslinking reaction initiated by UV radiation. In the absence of antioxidants, the compositions are subject to surface cracking when exposed to temperatures of 150° C. for periods of several days. Among the most useful antioxidants are 4,4'-bis(α,α-dimethylbenzyl)diphenylamine and blends of 4,4'-bis(α,α-dimethylbenzyl)diphenylamine with 4-(α,α-dimethylbenzyl)diphenylamine. Hindered phenols may be employed, but they interfere more with the curing reaction than do the aromatic amines. Antioxidants are usually incorporated at a level of between 0.5–2 parts per 100 parts polymer. Other additives may also be incorporated into the compositions of the invention, for example plasticizers, adhesion promoters, flame retardants, and process aids commonly used in rubber compounding.

Small amounts of inhibitors may also be present in the compositions of the invention as a result of the presence of these additives in commercial samples of acrylic or methacrylic crosslinking agents. The inhibitors are generally present in low amounts, for example below 1500 ppm (parts per million, based on the weight of the crosslinking agent). They act to prevent thermally induced polymerization of the crosslinking agents during storage and shipment.

The compositions of the invention are particularly suited for manufacture of elastomeric seals and gaskets in situ using a technique we refer to herein as gasketing in place. According to this technique, a curable elastomeric composition is heated to a temperature of 25°–250° C., preferably 90° C.–170° C. The heated composition is then metered onto a substrate to form an uncured seal of a desired thickness which is then cured. Thus, the seal is formed in place directly on the object to be sealed, rather than in a separate molding step. Typically, uncured seals are formed in thicknesses of 1–15 mm, preferably in thicknesses of 2–8 mm.

Robotized hot melt equipment may be used to apply gaskets in place. In one embodiment of the process of the present invention, a curable composition comprising a low viscosity elastomer component, multifunctional crosslinking agent, and UV initiator, is introduced to a drum having a heated platen and piston. The composition, when heated, becomes soft and extrudable. It is forced out of the drum by the action of the piston, generally at relatively low pressures, typically less than 5.0 bars (i.e. 0.5 MPa). The composition is then fed by gear or piston pumping through heated tubing to an application gun fitted to a multidimensional industrial robot capable of precise and rapid metering. In this way, the composition can be introduced into a groove of a part such as a thermoplastic article that has just been produced, for example by molding. The bead of uncured elastomer in the groove solidifies rapidly as it cools and forms an uncured sealing element. The groove can be in a part made from other materials as well, including but not limited to metal. Alternatively, the composition can be deposited onto the exterior of an object to form a seal. This hot melt application method is preferred for low viscosity elastomers, generally of Mooney viscosity 1–20 ML 1+4 (100° C.), especially ethylene acrylic elastomers, polyacrylate rubbers, nitrile rubbers, or ethylene vinyl acetate elastomers. The method permits extrusion from a drum using relatively low pressures. Continuous feeding and metering pumps are capable of handling compositions of the invention having viscosities up to 1000 Pa.s. Hot melt equipment may be used for compositions having somewhat higher viscosities, for example ML 1+4 (100° C.) of 70, by employing an extruder to introduce the composition into the heated tubing. The viscosity thereupon decreases, permitting formation of seals from the higher viscosity compositions.

In another embodiment of the process of the invention, relatively high viscosity compositions or compositions of relatively low heat resistance may be formed into uncured seals by the gasketing in place technique. Instead of using hot melt equipment, screw extruders are exclusively utilized to deliver the elastomeric composition to the article to be sealed. This technique is particularly useful when fluoroelastomers and chlorinated elastomers of Mooney viscosity 10–90 [ML 1+10 (121° C.)] are employed as the elastomeric component of the invention. An extruder that is used in combination with a flexible arm to apply a bead of uncured elastomer to a groove is particularly preferred for such gasketing in place processes. This differs from conventional extruder technology in that the extruder is not utilized to form the finished part. Instead, it pumps the uncured elastomer composition to a robotized application head that meters the composition and deposits it at the location to be sealed Use of screw extruders results in relatively high energy input to the polymer compared with processes that utilize hot melt equipment. In order to minimize elastomer degradation in the extruder, the extrusion process must not cause the temperature of the compound to rise above 250° C. This generally requires slow extrusion speeds. Consequently, extrusion processes are generally slower methods of manufacture. Further, such equipment requires high investment costs. Those skilled in the art will recognize that the appropriate temperature for extrusion will be dependent on the viscosity of the uncured elastomer, the molecular weight of the uncured elastomer, the level of crosslinking agent, the decomposition temperature of the photoinitiator and the volatilization temperature of the crosslinking agent and will select a value within the range of 25°–250° C. that is optimum for the particular circumstances.

The gasketing process of the present invention may be employed for manufacture of seals and gaskets using the compositions of the present invention or other curable elastomer compositions. Generally, the elastomer component will be present in an amount of from 70–99 parts by weight, the multifunctional crosslinker will be present in an amount of 0.5–29 parts by weight, and the UV initiator will be present in an amount of 0.1–10 parts by weight, all based on the combined weight of elastomer, crosslinker, and UV initiator. For example, the processes may be used to form gaskets from fluoroelastomer compositions comprising a fluoroelastomer, multifunctional crosslinker and UV initiator wherein the fluoroelastomer component of the composition does not contain a copolymerized brominated, iodinated, chlorinated or non-conjugated diene cure site monomer or iodinated or brominated polymer end groups. Such copolymers are commercially available and include dipolymers of vinylidene fluoride with hexafluoropropylene; terpolymers of vinylidene fluoride, hexafluoropropylene, and tetrafluoroethylene; and copolymers of tetrafluoroethylene and propylene. In addition, ethylene alpha-olefin elastomers, such as elastomeric copolymers and interpolymers of ethylene with one or more comonomers selected from propylene, 1-butene, 1-hexene, 1-octene, 4-methyl-1-penetene, and other $C_3$–$C_{20}$ alpha-olefins, are suitable elastomeric components in the UV curable composition. Elastomeric copolymers of ethylene, a $C_3$–$C_8$ olefin, and a diene may also be used in the process of the invention. These copolymers can be terpolymers, tetrapolymers or higher order copolymer elastomers of the ethylene/$C_3$–$C_8$ alpha olefin/diene type. These elastomers are copolymers of ethylene, a $C_3$–$C_8$ alpha-olefin and at least one non-conjugated diene. They may, in addition, contain a minor amount, generally up to 10 weight percent, of at least one other diene or triene having copolymerizable double bonds. Preferred $C_3$–$C_8$ alpha-olefins are propylene and butene. The non-conjugated dienes of the first type include 1,4-hexadiene; 2-methyl-1,5-hexadiene; vinyl norbornene; 8-methyl-4-ethylidene-1,7-octadiene; 1,9-octadecadiene; dicyclopentadiene; tricyclopentadiene; 5-ethylidene-2-norbornene; or 5-methylene-2-norbornene. Preferred dienes having one reactive double bond are 1,4-hexadiene, dicyclopentadiene and ethylidene norbornene. The non-conjugated dienes of the second type include norbornadiene; 1,4pentadiene; 1,5-hexadiene; 1,7-octadiene; 1,2-heneicosadiene; or 5-(5-hexenyl)-2-norbornene, preferably norbornadiene. These polymers are generally produced by polymerization in the presence of Ziegler-Natta catalysts or by polymerization in the presence of metallocene catalysts. Preparative techniques for ethylene alpha-olefin elastomers prepared in the presence of metallocene catalysts may be found in U.S. Pat. Nos. 5,278,272 and 5,272,236. Typical ethylene alpha-olefin copolymers and EPDM elastomers are commercially available as Engage® polyolefin elastomers and Nordel® hydrocarbon rubbers from DuPont Dow Elastomers L.L.C. The proportion of elastomer, multifunctional crosslinking agent, and UV initiator will generally be in the weight ratio of 70–99:0.5–19.5:0.1–10, respectively, when the elastomer is a fluoroelastomer and 80–98:1–20:0.2–5.0, respectively, when the elastomer is an ethylene alpha-olefin elastomer or an EPDM elastomer.

In order to optimize the elastomeric properties of seals made by the above-described processes, they must be crosslinked, i.e. cured. It would be impractical to utilize a beat-activated cure system to accomplish a rapid crosslinking reaction in such processes. One would risk converting the curable composition used to form the seals to an intractable, crosslinked material during the metering step. Specifically, as the curable composition was heated or subjected to temperature elevation caused by mechanical working, the crosslinking reaction would be triggered. It would be difficult to control premature gelling (i.e. scorch) during metering. Because crosslinked compositions do not flow readily, processes which result in scorchy products are undesirable. Consequently, heterolytic cure systems, which rely on thermally-induced crosslinking reactions, are not appropriate for the present process. In addition, the most common homolytic, i.e. free radical, curing processes, which depend on thermal decomposition of peroxides, are also unsuitable for use in the present process. It has, however, been found that curable compositions using the process of the invention can be effectively cured by UV induced free radical processes.

UV cure of elastomeric compositions using the process of the invention may be accomplished at room temperature or at higher temperatures. For example, in certain circumstances wherein the elastomeric composition is to be used as a sealant, it may be desirable to perform a photocure immediately after application of the uncured composition to the object to be sealed. At that point, the temperature of the composition may be as high as 250° C. However, heating the curable composition is neither necessary nor particularly desirable for an effective photocure. In addition, when the compositions are used to form seals by the gasketing in place technique on thermoplastic articles, low temperature cure minimizes any possibility of degradation or thermal distortion of the thermoplastic. Further, it is not necessary to perform the UV irradiation in an inert atmosphere. The cure reaction can be conducted under atmospheric conditions with no deleterious effects. In addition, it has also been found that in some cases, particularly when curing chlorinated or chlorosulfonated polyolefins, curing the composition under water is preferable to minimize heat buildup. This minimizes the tendency of these polymers to dehydrochlorinate, a process that causes polymer degradation and discoloration and which inhibits UV cure.

For purposes of the process of this invention, the wavelength spectrum of radiation used to effect the curing reaction typically corresponds to the absorption maximum of the UV initiator. This typically ranges from about 200–400 nanometers. Suitable UV radiation sources include medium pressure mercury vapor lamps, electrodeless lamps, pulsed xenon lamps, and hybrid xenon/mercury vapor lamps. A preferred arrangement comprises one or more lamps together with a reflector, which diffuses the radiation evenly over the surface to be irradiated. The radiation dosage must be sufficient to cure the polymeric composition, i.e. to produce a cured composition having a compression set of 90 or lower, preferably 50 or lower, and an elongation at break of at least 100%. A dosage of at least about 10 joules per square centimeter, and preferably 20 joules is usually sufficient for optimum cure. Dosage is a function of the time of exposure to the UV radiation, the distance from the UV radiation source and the power level of the radiation source. The required radiation dose can be readily determined by curing small samples of the curable composition and measuring physical properties, such as tensile strength, compression set and elongation, after cure. In most instances, an acceptable degree of cure can be obtained by exposures of 30–300 seconds using a lamp of about 80 W/cm. Appropriate adjustments may be made depending on the power of the lamp, distribution of the output over the UV range, the thickness of the sample as well as the polymeric component, level of crosslinking agent present, and level of filler present. For example, ethylene acrylate copolymer rubber containing filler would require a longer cure time than the same composition without filler.

Foaming agents may be incorporated into the curable compositions of the present invention. In such circumstances a cellular structure will be formed by exposure of the curable composition to UV radiation as a result of thermal decomposition of the foaming agent induced by simultaneous heating that occurs during exposure to UV light. This heating phenomenon may be augmented and controlled by additional external application of heat. Typical foaming agents that may be employed include p,p'-oxybisbenzenesulfonyl hydrazide, azodicarbon-amides, p-toluenesulfonyl semicarbazides, and dinitrosopentamethylene tetramine. Alternatively, the UV curing reaction may also be accomplished with cooling, so that curing and foaming occur sequentially, rather than simultaneously. That is, the curable composition is exposed to UV radiation with cooling, and the cured composition is then passed through a hot air tunnel to cause foaming. Closed cell structures of low specific gravity may be prepared by such processes. For example, structures with specific gravities of 0.25–6.0 g/cm$^3$ may be obtained.

Low viscosity compositions of the invention may be utilized as coating compositions for solvent-free systems or systems having low levels, i.e. up to about 2 wt. % of solvent, based on the total weight of elastomer, multifunctional crosslinker and UV initiator. It is thus not necessary to cast films from polymer solutions. Instead, the low viscosity curable composition flows onto the substrate by application of heat. The optimum ratio of elastomer, multifunctional crosslinking agent and UV initiator for coating compositions will be different from that of compositions useful in the manufacture of seals and gaskets. For example, a relatively thin coating will cure more quickly and permit use of relatively high levels of UV initiator because opacity will not be a problem. In addition, higher levels of multifunctional crosslinking agents may be employed to reduce viscosity and permit easier processing because coating compositions can tolerate higher hardness than gasketing materials. Further, coating compositions do not require the compression set resistance that is necessary for seals and gaskets.

The curable elastomeric compositions of the present invention are useful in manufacture of general rubber goods, coating compositions, foams and wire coating. They are most advantageously used however, in preparation of seals and gaskets for thermoplastic articles, particularly those employed in automotive applications.

The invention is illustrated by the following specific embodiments wherein all parts are by weight unless otherwise indicated.

EXAMPLES

Example 1

A curable elastomeric composition of the invention was prepared by mixing on a rubber mill 92.5 parts of a copolymer of ethylene and methyl acrylate (ethylene content 34 wt. %, Mooney viscosity ML1+4 (100° C.) of 8), 7.5 parts trimethylolpropane triacrylate, 0.75 parts Irgacure® 1800 photoinitiator (a mixture of 75 wt. % 1-hydroxycyclohexyl phenyl ketone and 25 wt. % bis( 2,6-dimethoxybenzoyl)-2, 4,4-trimethylphenylphosphine oxide, available from Ciba-Geigy, Ltd.), and 0.5 parts Naugard® 445 antioxidant (4,4'-di(α, α-dimethyl-benzyl)diphenylamine, available from Uniroyal, Inc.). Uncured slabs of 6 mm thickness were shaped by molding in a mold coated with Teflon® fluoropolymer resin. The slabs were exposed for one and two minutes respectively to UV radiation from a medium pressure mercury lamp which emitted radiation of wavelength approximately 250–400 nm at 80 watts/cm. The distance of the samples from the lamp was 10 cm. The cured samples exhibited the properties shown in Table I.

TABLE I

| Length of Exposure (Minutes) | 1 | 2 |
|---|---|---|
| Hardness, Shore A Surface Facing Source | 46 | 50 |
| Hardness, Shore A Surface Away From Source | 35 | 42 |

Example 2

A curable elastomeric composition of the invention was prepared by mixing on a rubber mill 92.5 parts of an acrylate rubber (ethyl acrylate homopolymer, Mooney viscosity ML1+4 (100° C.) of 36, available from Nippon Zeon KK), 7.5 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4trimethylphenylphosphine oxide, available from Ciba-Geigy), and 0.5 parts Naugard® 445 antioxidant (4,4'-di(α, α-dimethyl-benzyl)-diphenylamine, available from Uniroyal, Inc.). Uncured slabs of 6 mm thickness were shaped by molding in a mold coated with Teflon® fluoropolymer resin. The slabs were exposed for one and two minutes respectively to UV radiation from a medium pressure mercury lamp which emitted radiation of wavelength approximately 250–400 nm at 80 watts/cm. Cure was effected on samples placed 10 cm from the lamp. The cured samples exhibited the properties shown in Table II.

TABLE II

| Length of Exposure (Minutes) | 1 | 2 |
|---|---|---|
| Hardness, Shore A Surface Facing Source | 34 | 45 |
| Hardness, Shore A Surface Away From Source | 25 | 30 |

Example 3

A curable elastomeric composition of the invention was prepared by mixing on a rubber mill 92.5 parts of a copolymer of ethylene and vinyl acetate (ethylene content 32 wt. %, Mooney viscosity ML1+4 (100° C.) of 9), 7.5 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxy-benzoyl)-2, 4,4-trimethylphenylphosphine oxide, available from Ciba-Geigy, Ltd.), and 0.5 parts Naugard® 445 parts antioxidant (4,4'-di(α, α-dimethyl-benzyl)diphenylamine, available from Uniroyal, Inc.). Uncured slabs of 6 mm thickness were shaped by molding in a mold coated with Teflon® fluoropolymer resin. Samples of the rubber sheet were exposed for two minutes respectively to UV radiation from a medium pressure mercury lamp, which emitted radiation of from about 250 nm to 400 nm at 80 watts/cm. The distance of the samples from the lamp during the curing process was 10 cm. The cured samples exhibited the properties shown in Table III.

TABLE III

| Length of Exposure (Minutes) | 2 |
|---|---|
| Hardness, Shore A Surface Facing Source | 45 |
| Hardness, Shore A Surface Away From Source | 36 |

Example 4

Three curable compositions of the present invention, Samples 4A, 4B, and 4C, were prepared by mixing on a rubber mill 85 parts of a copolymer of ethylene and methyl acrylate (ethylene content 34 wt. %, Mooney viscosity ML1+4 (100° C.) of 8) and the components shown in Table IV. Uncured slabs of 6 mm thickness were shaped by molding in a mold coated with Teflon® fluoropolymer resin. The resultant polymer slabs were exposed for 4 minutes to UV radiation from a medium pressure mercury lamp, which emitted radiation of wavelength approximately 300–400 nm at a power of 80 W/cm. Exposure of the samples was at a distance of 10 cm from the lamp. Shore A hardness of the surface exposed to the lamp and the surface facing away from the lamp were determined for the 6 mm specimens. In addition, compression set of the cured compositions was determined according to ISO 815 on specimens died out of the 6 mm slabs. Results are shown in Table IV.

TABLE IV

| Sample Composition | 4A | 4B | 4C |
|---|---|---|---|
| Polymer (parts) | 85 | 85 | 85 |
| Trimethylolpropane triacrylate | 15 | — | — |
| Trimethylolpropane trimethacrylate | — | 15 | — |
| Diethyleneglycol dimethacrylate | — | — | 15 |
| Naugard ® 445 Antioxidant | 0.5 | 0.5 | 0.5 |
| Irgacure ® 1800 Photoinitiator | 1 | 1 | 1 |
| Physical Properties | | | |
| Hardness, Shore A (pts) Surface Exposed to Radiation | 69 | 68 | 65 |
| Hardness, Shore A (pts) Surface Away from Source | 61 | 59 | 55 |
| Compression Set (%) 22 hours @ 150° C., 25% deflection | 25 | 30 | 90 |

Example 5 and Comparative Example A

Three curable compositions of the present invention, Samples 5A, 5B, and 5C, were prepared by mixing on a rubber mill of a copolymer of ethylene and methyl acrylate (ethylene content 34 wt. %, Mooney viscosity ML1+4 (100° C.) of 8) and the components shown in Table V. Uncured slabs of 6 mm thickness were shaped by molding in a mold coated with Teflon® fluoropolymer resin. The resultant polymers were exposed for 2 minutes to UV radiation from a medium pressure mercury lamp, which emitted radiation of wavelength approximately 250–400 nm at a power of 80 W/cm. The distance of the samples from the lamp during the curing process was 10 cm. Shore A hardness of the surface of the 6 mm slabs exposed to the lamp and the surface facing away from the lamp were determined. In addition, compression set of the cured compositions was determined according to ISO 815 on specimens died out of the 6 mm slabs. Tensile strength, modulus, and elongation at break were determined according to ISO 37 T2 on 2 mm specimens. Results are shown in Table V. For purposes of comparison, a composition was prepared which contained a peroxide cure system. This composition was also prepared in the same manner as Samples 5A–5C. The components of the composition, labeled Sample A, are shown in Table V. Sample A was press cured at 1 80° C. for 4 minutes and physical properties of the cured composition were determined in the same manner as those of Samples 5A–5C. Compression molding of the control sample resulted in formation of blisters in the specimen and the physical properties of the sample were therefore difficult to determine.

TABLE V

| Sample Composition[1] | 5A | 5B | 5C | A |
|---|---|---|---|---|
| Polymer | 88 | 92.5 | 95 | 100 |
| Trimethlolpropane triacrylate | 10 | 7.5 | 5 | — |
| Irgacure ® 1800 Photoinitiator | 0.75 | 0.75 | 0.75 | — |
| N,N"-m-Phenylenedimaleimide | — | — | — | 2 |
| Peroxide[2] | — | — | — | 5 |
| Naugard ® 445 Antioxidant | 0.5 | 0.5 | 0.5 | 0.5 |
| Physical Properties | | | | |
| Time of Exposure to UV Light (Minutes) | 2 | 2 | 2 | — |
| Press Cure @ 160° C. (Minutes) | — | — | — | 30 |
| Hardness, Shore A (pts) Surface Exposed to Radiation | 59 | 50 | 42 | 30 |
| Hardness, Shore A (pts) Surface Away From Source | 56 | 42 | 38 | — |
| $T_B$ (MPa)[3] | 4.7 | 3.8 | 2.7 | 1.1 |
| $M_{100}$ (MPa)[4] | 2.2 | 1.2 | 0.6 | 0.5 |
| $M_{200}$ (MPa)[5] | 4.1 | 2.6 | 0.9 | 0.8 |
| $E_B$ (%)[6] | 250 | 317 | 450 | 250 |
| Compression Set (%) 168 hours, 150° C., 25% deflection | 25 | 33 | 38 | 85 |

[1]In parts by weight.
[2]Bis(t-butylperoxy)diisopropylbenzene (40% on inert support).
[3]Tensiie Strength at Break
[4]Modulus at 100% elongation
[5]Modulus at 200% elongation
[6]Elongation at break Example 6

A curable elastomeric composition of the invention, Sample 6, was prepared by mixing on a rubber mill 88 parts of a copolymer of ethylene and methyl acrylate (ethylene content 34 wt. %, Mooney viscosity ML1+4 (100° C.) of 8), 12 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl) diphenylamine, available from Uniroyal, Inc.). Uncured slabs of 6 mm thickness and 2 mm thickness were shaped by molding in a mold coated with Teflon® fluoropolymer resin. Samples of both the 2 mm thick slabs and the 6 mm thick slabs were exposed for 240 seconds to UV radiation from a medium pressure mercury lamp, which emitted radiation of wavelength approximately 300–400 nm at 80 watts/cm. The distance of the samples from the lamp during the curing process was 10 cm. The cured samples exhibited the hardness and compression set properties shown in Table VI. Test specimens of the cured composition were died out of the 6 mm slabs and used for compression set testing. Samples for tensile, modulus, and elongation testing were died out of the 2 mm slabs. Physical properties are shown in Table VI.

TABLE VI

| | Sample 6 |
|---|---|
| Composition (phr) | |
| Polymer | 88 |
| Naugard ® 445 Antioxidant | 0.5 |
| Trimethylolpropane triacrylate | 12 |
| Irgacure ® 1800 photoinitiator | 0.75 |
| Hardness, Shore A (6 mm thick specimens) | |
| Surface Exposed to Radiation (pts) | 63 |
| Surface Away from Source (pts) | 56 |
| Compression Set (%) | |
| 25% deflection | |
| After 170 hours in air at 150° C. | 24 |
| After 500 hours in air at 150° C. | 35 |
| After 1000 hours in air at 150° C. | 48 |
| After 170 hours in engine oil at 150° C. | 11 |
| After 500 hours in engine oil at 150° C. | 24 |
| After 1000 hours in engine oil at 150° C. | 45 |
| Physical Properties (2 mm thick specimens, room temperature) | |
| $T_B$ (MPa) | 7.9 |
| $M_{100}$ (MPa) | 4.0 |
| $E_B$ (%) | 366 |
| Hardness, Shore A (pts) | 60 |
| Physical Properties (2 mm thick specimens, aged at 150° C. for 1000 hours in air) | |
| $T_B$ (MPa) | 7.2 |
| $M_{100}$ (MPa) | 4.3 |
| $E_B$ (%) | 337 |
| Hardness, Shore A (pts) | 63 |
| Physical Properties (2 mm thick specimens, aged at 150° C. for 1000 hours in engine oil[1)] | |
| $T_B$, (MPa) | 7.3 |
| $M_{100}$ (MPa) | 4.9 |
| $E_B$ (%) | 196 |
| Hardness, Shore A (pts) | 57 |

[1]Shell Helix Plus ® 10W/40 Oil

Example 7

A curable elastomeric composition of the invention, Sample 7, was prepared by mixing on a rubber mill 88 parts of a copolymer of ethylene and methyl acrylate (ethylene content 34 wt. %, Mooney viscosity ML1+4 (100° C.) of 8), 12 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl)-diphenylamine, available from Uniroyal, Inc.). The composition was introduced to a 20 liter steel drum melter. The piston, which was maintained at a temperature of 140° C., heated and softened the composition while delivering it, at a pressure of 3.5 bars, to a gear pump which continuously fed a stream to a volumetric application gun mounted on an industrial robot. The composition was applied during a period of less than 15 seconds to the groove of a thermoplastic automobile engine cover. The groove had a total length of approximately 1.2 m. The cover was conveyed under a medium pressure mercury lamp having wavelength approximately 250–400 nm and a power rating of 100 W/cm. The lamp was approximately 15 cm from the surface of the curable composition. Exposure was for approximately 40 seconds. The composition was sufficiently cured to exhibit a Shore A hardness of 55–60.

Example 8

A curable elastomeric composition of the invention was prepared by mixing on a rubber mill 92.5 parts of a copolymer of butadiene and acrylonitrile (acrylonitrile content 41 wt. %; Mooney viscosity ML 1+4 (100° C.) of 80), 7.5 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl)diphenylamine, available from Uniroyal, Inc.). Uncured slabs of 2 mm and 6 mm thickness were shaped by molding in a mold coated with Teflon® fluoropolymer resin. The resultant 2 mm and 6 mm slabs were exposed for two minutes to UV radiation from a medium pressure mercury lamp (80 W/cm) that emitted radiation of wavelength approximately 250–400 nm at a distance of 10 cm from the lamp. Shore A hardness of the surface exposed to the lamp and the surface facing away from the lamp of the 6 mm slabs were determined. Tensile strength, modulus, and elongation at break of the cured compositions died from the 2 mm slab were determined according to ISO 37 T2. Results are shown in Table VII.

TABLE VII

| | Sample 8 |
|---|---|
| Composition (phr) | |
| Polymer | 92.5 |
| Naugard ® 445 Antioxidant | 0.5 |
| Trimethylolpropane triacrylate | 7.5 |
| Irgacure ® 1800 photoinitiator | 0.75 |
| Hardness, Shore A (6 mm thick specimens) | |
| Surface Exposed to Radiation | 49 |
| Surface Away from Source (pts) | 39 |
| Physical Properties (2 mm thick specimens) | |
| $T_B$ (MPa) | 1.7 |
| $M_{100}$ (MPa) | 1.1 |
| $E_B$ (%) | 174 |

Example 9

A curable elastomeric composition of the invention was prepared by mixing on a rubber mill 92.5 parts of a hydrogenated copolymer of butadiene and acrylonitrile (acrylonitrile content 33.5 wt. %; Mooney viscosity ML 1+4 (100° C.) of 70; double bond content less than 1%), 7.5 parts trimethylolpropane triacrylate, 0.75 parts Irgacure® 1800 photoinitiator (a mixture of 75 wt. % 1-hydroxy-cyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl)diphenylamine, available from Uniroyal, Inc.). Uncured slabs of 2 mm and 6 mm thickness were shaped by molding in a mold coated with Teflon® fluoropolymer resin. The resultant 2 mm and 6 mm slabs were exposed for two minutes to UV radiation from a medium pressure mercury lamp which emitted radiation of wavelength approximately 250–400 nm at a distance of 10 cm from the lamp. Shore A hardness of the surface exposed to the lamp and the surface facing away from the lamp of the 6 mm slabs were determined. Tensile strength, modulus, and elongation at break of the cured compositions died from the 2 mm slab were determined according to ISO 37 T2. Results are shown in Table VIII.

TABLE VIII

| | Sample 9 |
|---|---|
| Composition (phr) | |
| Polymer | 92.5 |
| Naugard ® 445 Antioxidant | 0.5 |
| Trimethylolpropane triacrylate | 7.5 |
| Irgacure ® 1800 photoinitiator | 0.75 |
| Hardness, Shore A (6 mm thick specimens) | |
| Surface Exposed to Radiation | 53 |
| Surface Away from Source (pts) | 39 |
| Physical Properties (2 mm thick specimens) | |
| $T_B$ (MPa) | 5.8 |
| $M_{100}$ (MPa) | 1.2 |
| $E_B$ (%) | 516 |

Example 10

A curable elastomeric composition of the invention was prepared by mixing on a rubber mill 92.5 parts of Therban® XN 535C (a hydrogenated terpolymer of butadiene, acrylonitrile, and a termonomer, available from Bayer AG), 7.5 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl) diphenylarnine, available from Uniroyal, Inc.). Uncured slabs of 2 mm and 6 mm thickness were shaped by molding in a mold coated with Teflon® fluoropolymer resin. The resultant 2 mm and 6 mm slabs were exposed for two minutes to UV radiation from a medium pressure mercury lamp (80 W/cm) that emitted radiation of wavelength approximately 250–400 nm at a distance of 10 cm from the lamp. Shore A hardness of the surface exposed to the lamp and the surface facing away from the lamp of the 6 mm slabs were determined. Tensile strength, modulus, and elongation at break of the cured compositions died from the 2 mm slab were determined according to ISO 37 T2. Results are shown in Table IX.

TABLE IX

| | Sample 10 |
|---|---|
| Composition (phr) | |
| Polymer | 92.5 |
| Naugard ® 445 Antioxidant | 0.5 |
| Trimethylolpropane triacrylate | 7.5 |
| Irgacure ® 1800 photoinitiator | 0.75 |
| Hardness, Shore A (6 mm thick specimens) | |
| Surface Exposed to Radiation | 42 |
| Surface Away from Source (pts) | 36 |

TABLE IX-continued

|  | Sample 10 |
|---|---|
| Physical Properties (2 mm thick specimens) | |
| $T_B$ (MPa) | 4.6 |
| $M_{100}$ (MPa) | 1.2 |
| $E_B$ (%) | 351 |

Example 11

A curable elastomeric composition of the invention, Sample 11A, was prepared by mixing on a rubber mill 92.5 parts of a copolymer of ethylene and methyl acrylate (ethylene content 34 wt. %, Mooney viscosity ML(1+4 @ 100° C. of 8), 7.5 parts pentaerythritol tetraacrylate (Sartomer 295, available from Sartomer, Inc.), 0.75 parts Irgacure® 1800 photoinitiator (a mixture of 75 wt. % 1-hydroxy-cyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl) diphenylamine, available from Uniroyal, Inc.). Uncured slabs of 6 mm thickness and 2 mm thickness were shaped by molding in a mold coated with Teflon® fluoropolymer resin. Samples of the 2 mm thick slabs thick slabs were exposed for 120 seconds to UV radiation from a medium pressure mercury lamp (80 W/cm), which emitted radiation of wavelength greater than 250 nm. Samples of the 6 mm thick slabs thick slabs were similarly exposed for 240 seconds. The distance of the samples from the lamp during the curing process was 10 cm. The cured samples exhibited the hardness and compression set properties shown in Table X. Test specimens of the cured composition were died out of the 6 mm slabs and used for compression set testing. Samples for tensile, modulus, and elongation testing were died out of the 2 mm slabs. Physical properties are shown in Table X. Samples 11B, C, and D were similarly prepared using the ingredients shown in Table X. Test results for Samples are 11B–D are also shown in Table X.

TABLE X

|  | 11A | 11B | 11C | 11D |
|---|---|---|---|---|
| Composition (phr) | | | | |
| Polymer | 92.5 | 92.5 | 92.5 | 92.5 |
| Pentaerythritol Tetraacrylate[1] | 7.5 | 5 | 0 | 0 |
| Pentaerythritol Pentaacrylate[2] | 0 | 0 | 7.5 | 5 |
| Naugard ® 445 Antioxidant | 0.5 | 0.5 | 0.5 | 0.5 |
| Irgacure ® 1800 Photoinitiator | 0.75 | 0.75 | 0.75 | 0.75 |
| Hardness, Shore A (6 mm thick specimens) | | | | |
| Surface exposed to radiation (pts) | 52 | 39 | 52 | 44 |
| Surface away from source (pts) | 45 | 37 | 46 | 39 |
| Compression Set (%) | | | | |
| 168 hours @ 150° C. in air | 30 | 39 | 32 | 39 |
| Physical Properties (2 mm thick specimens)[3] | | | | |
| $M_{100}$ (MPa) | 1.6 | 0.6 | 1.7 | 0.8 |
| $T_B$ (MPa) | 4.3 | 2.7 | 3.9 | 3.3 |
| $E_B$ (%) | 236 | 383 | 200 | 332 |
| Hardness, Shore A Surface exposed to radiation (pts) | 50 | 40 | 50 | 43 |

[1]Sartomer 295 (pentaerythritol tetraacrylate, available from Sartomer, Inc.
[2]Sartomer 399 (dipentaerythritol pentaacrylate, available from Sartomer, Inc.
[3]Stress/strain properties measured according to ISO 37-T2 @ room temperature

Example 12

A curable elastomeric composition of the invention, Sample 12A, was prepared by mixing on a rubber mill 92.5 parts of Therban® A 4307 Rubber (a hydrogenated copolymer of butadiene and acrylonitrile, available from Bayer AG), 7.5 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), and 0.5 parts Naugard® 445 antioxidant (4,4'-di(α, α-dimethylbenzyl)-diphenylamine, available from Uniroyal, Inc.). Uncured slabs of 2 mm thickness were shaped by molding in a mold coated with Teflon® fluoropolymer resin. The resultant 2 mm slabs were exposed for four minutes to UV radiation from a medium pressure mercury lamp (80 W/cm) which emitted radiation of wavelength greater than 250 nm at a distance of 10 cm from the lamp. Shore A hardness, tensile strength, modulus, and elongation at break of the cured compositions died from the 2 mm slab were determined according to ISO 37 T2 at room temperature. Results are shown in Table XI. Two further compositions of the invention, Samples 12B and 12C, were prepared in a similar fashion using the proportion of components shown in Table XI. Test specimens were prepared as described for Sample 12 A and results are shown in Table XI.

TABLE XI

| Composition (phr) | Sample 12A | Sample 12B | Sample 12C |
|---|---|---|---|
| Polymer | 92.5 | 92.5 | 92.5 |
| Naugard ® 445 Antioxidant | 0.5 | 0.5 | 0.5 |
| Trimethylolpropane triacrylate | 7.5 | 7.5 | 7.5 |
| Irgacure ® 1800 photoinitiator | 0.75 | 1.2 | 2 |
| Physical Properties (2 mm thick specimens) | | | |
| $T_B$ (MPa) | 8.5 | 6.5 | 7 |
| $M_{100}$ (MPa) | 1.5 | 1.2 | 1.3 |
| $E_B$ (%) | 490 | 420 | 420 |
| Hardness Shore A Surface exposed to radiation (pts) | 58 | 58 | 58 |
| Compression Set (%) | 75 | 62 | 58 |
| 168 hours @ 150° C. in air | | | |

Example 13

A curable elastomeric composition of the invention, Sample 13, was prepared substantially in the same manner and using the same components as Sample 12B except that 92.5 parts of Therban® Rubber A 4367 (a hydrogenated copolymer of butadiene and acrylonitrile, available from Bayer AG; acrylonitrile content 43 wt. %; Mooney viscosity ML 1+4 (100° C.) of 70; double bond content 5.5%), was used in place of Therban® A 4307 as the polymer component. Uncured slabs of 2 mm thickness were shaped by molding in a mold coated with Teflon® fluoropolymer resin. The resultant 2 mm slabs were exposed for four minutes to UV radiation from a medium pressure mercury lamp (80 W/cm) that emitted radiation of wavelength greater than 250 nm at a distance of 10 cm from the lamp. Tensile strength, modulus, and elongation at break of the cured compositions died from the 2 mm slab were determined according to ISO 37 T2 at room temperature. Results are shown in Table XII. Test specimens were prepared as described for Sample 12 A and results are shown in Table XII.

TABLE XII

| Composition (phr) | Sample 12B | Sample 13 |
|---|---|---|
| Therban ® A 4307 Rubber | 92.5 | 0 |
| Therban ® A 4367 Rubber | 0 | 92.5 |
| Naugard ® 445 Antioxidant | 0.5 | 0.5 |
| Trimethylolpropane triacrylate | 7.5 | 7.5 |
| Irgacure ® 1800 photoinitiator | 1.2 | 1.2 |
| Physical Properties (2 mm thick specimens) | | |
| $T_B$ (MPa) | 6.5 | 5.7 |
| $M_{100}$ (MPa) | 1.2 | 1.6 |
| $E_B$ (%) | 420 | 320 |
| Hardness Shore A | 58 | 59 |
| Surface exposed to radiation (pts) | | |
| Compression Set (%) | 62 | 53 |
| 168 hours @ 150° C. in air | | |

Example 14

A curable elastomeric composition of the invention, Sample 14A, was prepared by mixing on a rubber mill 92.5 parts of Elvaloy® 742 resin modifier (a copolymer of ethylene, vinyl acetate and carbon monoxide containing 28.5 wt. % vinyl acetate units, and 9 wt. % carbon monoxide units, having a melt index of 35 g/10 minutes, available from E. I. du Pont de Nemours and Co.), 7.5 parts trimethylolpropane triacrylate, and 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.) Uncured slabs of 2 mm thickness were shaped by molding in a mold coated with Teflon® fluoropolymer resin. The resultant 2 mm slabs were exposed for two minutes to UV radiation from a mercury lamp (80 W/cm) that emitted radiation of wavelength greater than 250 nm at a distance of 10 cm from the lamp. Shore A hardness of the surface exposed to the lamp and the surface facing away from the lamp were determined. Tensile strength, modulus, and elongation at break of the cured compositions died from the 2 mm slab were determined according to ISO 37 T2. Results are shown in Table XIII. In addition, Samples 14B and 14C were prepared and tested in a similar manner. Sample 14B contained Elvaloy® HP 661 resin modifier (a copolymer of ethylene, butyl acrylate and carbon monoxide containing 29 wt. % butyl acrylate units, and 10 wt. % carbon monoxide units, having a melt index of 12 g/10 minutes, available from E. I. du Pont de Nemours and Co.) as the polymeric component. Sample 14C contained Elvaloy® AS resin modifier (a copolymer of ethylene, n-butyl acrylate and glycidyl methacrylate containing 28 wt. % n-butyl acrylate units, and 5.25 wt. % glycidyl methacrylate units, having a melt index of 12 g/10 minutes, available from E. I. du Pont de Nemours and Co.) as the polymeric component. Physical test results are shown in Table XIII.

TABLE XIII

| Composition | 14A | 14B | 14C |
|---|---|---|---|
| Elvaloy ® 742 resin modifier | 92.5 | 0 | 0 |
| Elvaloy ® HP 661 resin modifier | 0 | 92.5 | 0 |
| Elvaloy ® AS resin modifier | 0 | 0 | 92.5 |
| Trimethylpropane triacrylate | 7.5 | 7.5 | 7.5 |
| Irgacure ® 1800 photoinitiator | 0.75 | 0.75 | 0.75 |
| Hardness, Shore A (2 mm thick specimens) | | | |
| Uncured Hardness (points) | 58 | 64 | 65 |
| Surface Exposed to Radiation (points) | 68 | 68 | 72 |
| Surface Away from Source (points) | 66 | 67 | 71 |
| Physical Properties (2 mm thick specimens) | | | |
| $T_B$ (MPa) | 9.6 | 7.8 | 9.9 |
| $M_{100}$ (MPa) | 3.9 | 3.1 | 3.1 |
| $E_B$ (%) | 350 | 420 | 600 |
| Compression Set (%), 70 hours @ 125° C. | 42 | 28 | 32 |

Example 15

A curable elastomeric composition of the invention was prepared by mixing on a rubber mill 90.3 parts of a copolymer of ethylene and methyl acrylate (ethylene content 34 wt. %, Mooney viscosity ML 1+4 (100° C.) of 8), 8.46 parts trimethylolpropane triacrylate, 0.75 parts Irgacure® 1800 photoinitiator (a mixture of 75 wt. % 1-hydroxycyclohexyl phenyl ketone and 25 wt. % bis(2,6-dimethoxybenzoyl)-2,4,4-trimethylphenylphosphine oxide, available from Ciba-Geigy, Ltd.), 0.49 parts Naugard® 445 antioxidant (4,4'-di (α, α-dimethyl-benzyl)-diphenylamine, available from Uniroyal, Inc.), and 5 parts of Celogen® OT blowing agent [p,p'-oxybis(benzenesulfonyl hydrazide), available from Uniroyal, Inc.]. Uncured slabs of 2 mm thickness were shaped by molding in a mold coated with Teflon® fluoropolymer resin. The slabs were exposed for 4 minutes to UV radiation from a medium pressure mercury lamp (80 W/cm) that emitted radiation of wavelength greater than 250 nm. The distance of the samples from the lamp was 10–15 cm. The temperature of the cured samples at the conclusion of UV exposure was 140°–150° C. A foam having a closed cell structure with integral skin was formed having specific gravity down to 0.3 glcm.

Example 16

A curable elastomeric composition of the invention, Sample 16A, was prepared by mixing the following components on a rubber mill: 94 parts of a copolymer of vinylidene fluoride ($VF_2$), perfluoromethyl perfluorovinyl ether (PMVE), tetrafluoroethylene (TFE), and 4-bromo-3,3,4,4-tetrafluorobutene-1(BTFB) (weight ratio $VF_2$:TFE:PMVE:BTFB 54:10:35:1.2), 6.0 parts trimethylolpropane triacrylate, and 0.5 parts Irgacure 1800® photoinitiator. The milled composition was shaped into uncured slabs of 2 mm thickness were shaped by molding in a mold coated with Teflon® fluoropolymer resin. An uncured slab was exposed for one minute to UV radiation from a medium pressure mercury lamp that emitted radiation of wavelength approximately 250–400 nm at 80 watts/cm. The distance of the samples from the lamp was 10 cm. The cured samples exhibited the properties shown in Table XIV. Two additional samples, 16B and 16C, were prepared in substantially the same manner except that Sample 16B contained 8 parts of trimethylolpropane triacrylate and Sample 16C contained 0.5 parts tri-n-butyltin hydride in addition to the 6 parts of trimethylolpropane triacrylate. Samples 16B and 16C were cured substantially in the same manner as Sample 16A.

Physical properties of the cured slabs are shown in Table XIV.

TABLE XIV

| Sample Composition | 16A | 16B | 16C |
|---|---|---|---|
| Polymer | 94 | 92 | 94 |
| Trimethylolpropane triacrylate | 6 | 8 | 6 |
| Irgacure ® 1800 Photoinitiator | 0.5 | 0.5 | 0.5 |
| Tri-n-butyltin hydride | — | — | 0.5 |
| Physical Properties | | | |
| Hardness, Shore A (pts) Surface Exposed to Radiation | 59 | 70 | — |
| $T_B$ (MPa) | 9.1 | 10.9 | 13.8 |
| $M_{100}$ (MPa) | 3.1 | 5.4 | 7 |
| $E_B$ (%) | 450 | 339 | 273 |
| Compression Set (%) 22 hours, 150° C., 25% deflection, 2 minute UV exposure | 69 | — | 36 |

Example 17

A curable elastomeric composition of the invention, Sample 17A, was prepared by mixing the following components on a rubber mill: 94 parts of an iodinated copolymer $VF_2$, PMVE, TFE, and BTFB (weight ratio $VF_2$:TFE:PMVE:BTFB 54:10:35:0.6; prepared in the presence of an iodinated chain transfer agent and having an iodine content of 0.18), 6.0 parts trimethylolpropane triacrylate, and 1 part Irgacure 1800® photoinitiator. The milled composition was shaped into uncured slabs of 2 mm thickness were shaped by molding in a mold coated with Teflon® fluoropolymer resin. An uncured slab was exposed for one minute to UV radiation from a medium pressure mercury lamp which emitted radiation of wavelength approximately 250–400 nm at 80 watts/cm. The distance of the samples from the lamp was 10 cm. The cured samples exhibited the properties shown in Table XV. Three additional samples, 17B, 17C, and 17D, were prepared in substantially the same manner except that each contained 0.5 parts of Irgacure 1800, Sample 17B contained 94 parts of an iodine-free copolymer of VF2, PMVE, TFE, and BTFB having a monomer ratio of 54:10:35:1.2; Sample 17C contained 94 parts of an iodinefree copolymer of VF2, PMVE, TFE, and BTFB having a monomer ratio of 52.9:10.2:34.9:2.2; and Sample 17D contained 94 parts of an iodine-free copolymer of $VF_2$, PMVE, TFE, and BTFB having a monomer ratio of 53.5:10:34.4:2.2. Samples 17B–17D were cured substantially in the same manner as Sample 17A. Physical properties of the cured slabs are shown in Table XV.

TABLE XV

| Sample Composition | 17A | 17B | 17C | 17D |
|---|---|---|---|---|
| Polymer | 94 | 94 | 94 | 94 |
| Trimethylolpropane triacrylate | 6 | 6 | 6 | 6 |
| Irgacure ® 1800 Photoinitiator | 1 | 0.5 | 0.5 | 0.5 |
| Physical Properties | | | | |
| Hardness, Shore A (pts) Surface Exposed to Radiation | 49 | 59 | 60 | — |
| $T_B$ (MPa) | 2 | 9.1 | 7.5 | 9.9 |
| $M_{100}$ (MPa) | 1.4 | 3.1 | 3.3 | 3.8 |
| $E_B$ (%) | 537 | 450 | 346 | 431 |
| Compression Set (%) 22 hours, 150° C., 25% deflection, 2 minute UV exposure | — | 69 | 75.3 | 76.2 |

Example 18

A curable elastomeric composition of the invention, Sample 18A, was prepared by mixing the following components on a rubber mill: 92 parts of a copolymer $VF_2$, PMVE, TFE, and BTFB (weight ratio $VF_2$:TFE:PMVE:BTFB 52.9:10.2:34.9:2.0), 8.0 parts trimethylolpropane triacrylate, and 0.5 parts Irgacure 1800® photoinitiator. The milled composition was shaped into uncured slabs of mm thickness were shaped by molding in a mold coated with Teflon® fluoropolymer resin. An uncured slab was exposed for one minute to UV radiation from a medium pressure mercury lamp which emitted radiation of wavelength approximately 250400 nm at 80 watts/cm. The distance of the samples from the lamp was 10 cm. The cured samples exhibited the properties shown in Table XVI. An additional sample, 1 8B, was prepared in substantially the same manner. However, Sample 18B contained 100 parts polymer and additionally contained 0.5 parts tri-n-butyltin hydride. Sample 18B was cured substantially in the same manner as Sample 18A. Physical properties of the cured slabs are shown in Table XVI.

TABLE XVI

| Sample Composition | 18A | 18B |
|---|---|---|
| Polymer | 92 | 100 |
| Trimethylolpropane triacrylate | 8 | 8 |
| Irgacure ® 1800 Photoinitiator | 0.5 | 0.5 |
| Tri-n-butyltin Hydride | — | 0.5 |
| Physical Properties | | |
| Hardness, Shore A (pts) Surface Exposed to Radiation | — | 68 |
| $T_B$ (MPa) | 10 | 11.8 |
| $M_{100}$ (MPa) | 6 | 6.3 |
| $E_B$ (%) | 284 | 239 |
| Compression Set (%) 22 hours, 120C, 25% deflection, 2 minute UV exposure | 74.4 | 35.4 |

Example 19

A curable elastomeric composition of the invention, Sample 19A, was prepared by mixing the following components on a rubber mill: 92 parts of a copolymer $VF_2$, PMVE, TFE, and BTFB (weight ratio $VF_2$:TFE:PMVE:BTFB 53.5:10:34.4:2.2), 8.0 parts trimethylolpropane triacrylate, and 0.5 parts Irgacure 1800® photoinitiator. The milled composition was shaped into uncured slabs of 2 mm thickness were shaped by molding in a mold coated with Teflon® fluoropolymer resin. An uncured slab was exposed for one minute to UV radiation from a medium pressure mercury lamp which emitted radiation of wavelength approximately 250–400 nm at 80 watts/cm. The distance of the samples from the lamp was 10 cm. The cured samples exhibited the properties shown in Table XVII. An additional sample, 19B, was prepared in substantially the same manner. However, Sample 19B contained 100 parts polymer, 1 part Irgacure 1800® photoinitiator and additionally contained 1 part tri-n-butyltin hydride. Sample 19B was cured substantially in the same manner as Sample 19A. Physical properties of the cured slabs are shown in Table XVII.

TABLE XVII

| Sample Composition | 19A | 19B |
|---|---|---|
| Polymer | 92 | 100 |
| Trimethylolpropane triacrylate | 8 | 8 |
| Irgacure ® 1800 Photoinitiator | 0.5 | 1.0 |
| Tri-n-butyltin Hydride | — | 0.5 |
| Physical Properties | | |
| Hardness, Shore A (pts) Surface Exposed to Radiation | 61 | 71 |
| $T_B$ (MPa) | 9.9 | 11.8 |
| $M_{100}$ (MPa) | 5.7 | 7.3 |
| $E_B$ (%) | 356 | 215 |
| Compression Set (%) 22 hours, 150° C., 25% deflection, 2 minute UV exposure | 71.5 | 43.3 |

Example 20

A curable elastomeric composition of the invention, Sample 20, was prepared by mixing the following components on a rubber mill: 90 parts of a chlorosulfonated polyethylene elastomer [chlorine content 29 wt. %, sulfur content of 1.4 wt. % and a Mooney viscosity, ML 1+4 (100° C.) of 22], 10.0 parts trimethylolpropane triacrylate, and 0.5 parts Irgacure® 184 photoinitiator (1-hydroxycyclohexyl phenyl ketone, available from Ciba Geigy, Inc.). The milled composition was shaped into uncured slabs of 2 mm thickness for tensile testing specimens and 6 mm thickness for cutting compression set disks. The slabs were shaped by molding in a mold coated with Teflon® fluoropolymer resin. The uncured slabs were exposed to UV radiation from a medium pressure mercury lamp which emitted radiation of wavelength approximately 250–400 nm at 80 watts/cm. The 2 mm slabs were exposed for 4 minutes and the 6 mm slabs were exposed for 6 minutes. Exposure was effected under water to limit the heat build-up in the elastomeric composition which could cause excessive dehydrochlorination and polymer degradation. The distance of the samples from the lamp was 10 cm. The cured samples exhibited the properties shown in Table XVIII.

TABLE XVIII

| Sample Composition | 20 |
|---|---|
| Polymer | 90 |
| Trimethylolpropane triacrylate | 10 |
| Irgacure ® 184 Photoinitiator | 0.5 |
| Physical Properties | |
| Hardness,[1] Shore A (pts) Surface Exposed to Radiation | 63 |
| Hardness,[1] Shore A (pts) Surface Away From Source | 61 |
| $T_B$ (MPa) | 4.7 |
| $M_{100}$ (MPa) | 3.6 |
| $E_B$ (%) | 128 |

TABLE XVIII-continued

| Sample Composition | 20 |
|---|---|
| Compression Set (%) 70 hours, 125° C., 25% deflection, 4 minute UV exposure | 57 |

[1]6 mm slabs in water

Example 21

A curable elastomeric composition of the invention, Sample 21, was prepared by mixing the following components on a rubber mill: 85 parts of a chlorinated polyethylene elastomer [chlorine content 36 wt. % and a Mooney viscosity, ML 1+4 (121° C.) of 36], 15 parts trimethylolpropane triacrylate, 1 part Irgacure 1800® photoinitiator and 0.5 parts Naugard® 445 antioxidant (4,4'-bis-(α,α-dimethylbenzyl)diphenylamine). The milled composition was shaped into uncured slabs of 2 mm thickness for preparation of tensile specimens and 6 mm thickness for cutting compression set disks. The slabs were shaped by molding in a mold coated with Teflon® fluoropolymer resin. An uncured slab was exposed for 4 minutes, under water, to limit the heat build-up in the elastomeric compositions, to UV radiation from a medium pressure mercury lamp which emitted radiation of wavelength approximately 250–400 nm at 80 watts/cm. The distance of the samples from the lamp was 10 cm. The cured samples exhibited the properties shown in Table XIX.

TABLE XIX

| Sample Composition | 21 |
|---|---|
| Polymer | 85 |
| Trimethylolpropane triacrylate | 15 |
| Irgacure ® 1800 Photoinitiator | 1.0 |
| Naugard ® 445 Antioxidant | 0.5 |
| Physical Properties | |
| Hardness,[1] Shore A (pts) Surface Exposed to Radiation | 94 |
| Hardness,[1] Shore A (pts) Surface Away From Source | 91 |
| $T_B$ (MPa) | 10.9 |
| $E_B$ (%) | 93 |
| Compression Set (%) 70 hours, 125° C., 25% deflection, 4 minute UV exposure, 6 mm slab | 58 |

[1]6 mm slabs in water

Example 22

A curable elastomeric composition of the invention, Sample 22, was prepared by mixing the following components on a rubber mill: 90 parts of Hydrin® C 2000L epichlorohydrin elastomer (an epichlorohydrin/ethylene oxide copolymer, chlorine content 26 wt. %, Mooney viscosity 65, available from Nippon Zeon, Inc.), 10.0 parts trimethylolpropane triacrylate, and 0.75 parts Irgacure 184® photoinitiator (1-hydroxycyclohexyl phenyl ketone, available from Ciba Geigy, Inc.). The milled composition was shaped into uncured slabs of 2 mm thickness for preparation of tensile specimens and 6 nun thickness for cutting compression set disks. The slabs were shaped by molding in a mold coated with Teflon® fluoropolymer resin. An uncured slab was exposed for 4 minutes in water to UV radiation from a medium pressure mercury lamp which emitted radiation of wavelength approximately 250–400 nm at 80 watts/cm. The distance of the samples from the lamp was 10 cm. The cured samples exhibited the properties shown in Table XX.

TABLE XX

| Sample Composition | 22 |
|---|---|
| Polymer | 90 |
| Trimethylolpropane triacrylate | 10 |
| Irgacure ® 184 Photoinitiator | 0.75 |
| Physical Properties | |
| Hardness[1], Shore A (pts) Surface Exposed to Radiation | 54 |
| Hardness[1], Shore A (pts) Surface Away From Source | 50 |
| $T_B$ (MPa) | 4.6 |
| $M_{100}$ (MPa) | 3.3 |
| $E_B$ (%) | 187 |
| Compression Set (%) 70 hours, 120° C., 25% deflection, 4 minute UV exposure | 24 |

[1] 6 mm slabs in water

We claim:

1. A process for applying a seal to an article comprising the steps of

A) mixing at a temperature of between 25° C. and 250° C. a composition comprising:
   1) 75 to 95 weight percent of an elastomer selected from the group consisting of
      a) copolymers comprising ethylene and a comonomer selected from the group consisting of $C_1$–$C_8$ alkyl esters of acrylic acid, $C_1$–$C_8$ alkyl esters of methacrylic acid, and vinyl esters of $C_2$–$C_8$ carboxylic acids;
      b) alkyl acrylate polymers selected from the group consisting of homopolymers of $C_1$–$C_{10}$ alkyl acrylates and copolymers of $C_1$–$C_{10}$ alkyl acrylates with up to 40 weight percent monovinyl monomers; and
      c) diene copolymers selected from the group consisting of copolymers of a diene and an unsaturated nitrile and hydrogenated copolymers of a diene and an unsaturated nitrile;
   2) 2 to 24 weight percent of a multifunctional crosslinking agent selected from the group consisting of multifunctional acrylic crosslinking agents, multifunctional methacrylic crosslinking agents, multifunctional cyanurate crosslinking agents, and multifunctional isocyanurate crosslinking agents; and
   3) 0.2 to 5.0 weight percent of a UV initiator wherein the weight percentages of each of 1), 2), and 3) are based on the combined weight of 1), 2), and 3), to form a thermally stable, curable, extrudable mixture;

B) depositing said extrudable mixture on said article in the shape and thickness desired to form an uncured seal; and C) irradiating said uncured seal with UV radiation for a time sufficient to cure said seal by reaction of said elastomer with said multifunctional crosslinking agent to form interchain and intrachain crosslinks.

2. The process of claim 1 wherein the curable composition is heated to a temperature of 90°–170° C. in step A).

3. The process of claim 1 wherein the article is made of a thermoplastic material.

4. The process of claim 1 wherein the elastomer is a copolymer comprising ethylene and a comonomer selected from the group consisting of $C_1$–$C_8$ alkyl esters of acrylic acid and vinyl esters of $C_2$–$C_8$ carboxylic acids.

5. The process of claim 4 wherein the elastomer is a copolymer of ethylene and a $C_1$–$C_8$ alkyl ester of acrylic acid.

6. The process of claim 5 wherein the elastomer is a copolymer of ethylene and methyl acrylate.

7. The process of claim 4 wherein the elastomer is ethylene vinyl acetate.

8. The process of claim 1 wherein the elastomer is a copolymer comprising
   a) ethylene;
   b) a comonomer selected from the group consisting of $C_1$–$C_8$ alkyl esters of acrylic acid, $C_1$–$C_8$ alkyl esters of methacrylic acid, and vinyl esters of $C_2$–$C_8$ carboxylic acids; and
   c) a comonomer selected from the group consisting of carboxylic acids of 3–12 carbon atoms selected from the group consisting of alpha, beta-unsaturated monocarboxylic acids, alpha, beta-unsaturated dicarboxylic acids and monoesters of alpha, beta-unsaturated dicarboxylic acids.

9. The process of claim 8 wherein component c) is a monoester of an alpha, beta-unsaturated dicarboxylic acid.

10. The process of claim 1 wherein the elastomer is a homopolymer of a $C_1$–$C_{10}$ alkyl acrylate.

11. The process of claim 1 wherein the elastomer is a copolymer of a $C_1$–$C_{10}$ alkyl acrylate with up to 40 weight percent monovinyl monomer.

12. The process of claim 1 wherein the elastomer is a copolymer of a diene and an unsaturated nitrile.

13. The process of claim 1 wherein the multifunctional crosslinking agent is a multifunctional acrylate.

14. The process of claim 1 wherein the multifunctional crosslinking agent is a multifunctional methacrylate.

15. A cured article produced by the process of claim 1.

16. The process of claims 1 wherein the uncured seal is irradiated using a UV radiation source selected from the group consisting of medium pressure mercury vapor lamps, electrodeless lamps, pulsed xenon lamps, and hybrid xenon/mercury vapor lamps.

17. The process of claim 1 wherein the uncured seal is irradiated using UV radiation of wavelength from 200–400 nanometers.

18. The process of claim 1 wherein the uncured seal is irradiated using a radiation dose of between 10–20 joules per square centimeter.

19. The process of claim 1 wherein the thermally stable, curable, extrudable mixture additionally comprises a filler.

* * * * *